United States Patent
Deck

(10) Patent No.: US 6,924,898 B2
(45) Date of Patent: Aug. 2, 2005

(54) PHASE-SHIFTING INTERFEROMETRY METHOD AND SYSTEM

(75) Inventor: Leslie L. Deck, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 237 days.

(21) Appl. No.: 10/304,209

(22) Filed: Nov. 26, 2002

(65) Prior Publication Data

US 2003/0160968 A1 Aug. 28, 2003

Related U.S. Application Data

(63) Continuation-in-part of application No. 09/919,511, filed on Jul. 31, 2001.
(60) Provisional application No. 60/339,214, filed on Dec. 10, 2001, and provisional application No. 60/223,803, filed on Aug. 8, 2000.

(51) Int. Cl.⁷ .................................................. G01B 9/02
(52) U.S. Cl. ...................................................... 356/512
(58) Field of Search ................................ 356/496, 504, 356/511, 512, 513, 514, 519

(56) References Cited

U.S. PATENT DOCUMENTS

| | | | |
|---|---|---|---|
| 4,594,003 A | 6/1986 | Sommargren | |
| 5,488,477 A | 1/1996 | de Groot et al. | |
| 5,502,566 A | 3/1996 | Ai et al. | |
| 6,006,128 A | 12/1999 | Izatt et al. | |
| 6,028,670 A | 2/2000 | Deck | |
| 6,359,692 B1 | 3/2002 | de Groot | |
| 2003/0164951 A1 * | 9/2003 | Deck | 356/519 |

FOREIGN PATENT DOCUMENTS

WO  WO 02/12825  2/2002

OTHER PUBLICATIONS

Doorer, Christophe et al. "Precision and consistency criteria in spectral phase interferometry for direct electric–field reconstruction." Journal of the Optical Society of America, vol. 19, Issue 5, May 2002, pp. 1030–1038.*
Kim, Daesuk et al. "Direct spectral phase function calculation for dispersive interferometric thickness profilometry." Optics Express, vol. 12, No. 21, Oct. 2004, pp. 5117–5124.*
L. Deck; "Measurements using Fourier–Transform Phase Shifting Interferometry", Proc. ASPE 25, 115–118 (2001).
L. Deck; "Multiple Surface Phase Shifting Interferometry", Proc. SPIE, 4451, 424–430 (2001).
L. Deck and J.A. Soobitsky, "Phase–shifting via wavelength tuning in very large aperture interferometers," Proc. SPIE, 3782–58, 432–442, 1999.
L. Deck; "Simultaneous Multiple Surface Measurements using Fourier–Transform Phase Shifting Interferometry, in: 4th International workshop on automatic processing of fringe patterns", Fringe 2001, Elsevier, Paris, (2001), 230–236.

(Continued)

Primary Examiner—Samuel A. Turner
Assistant Examiner—Michael A. Lyons
(74) Attorney, Agent, or Firm—Fish & Richardson P.C.

(57) ABSTRACT

An interferometry method including: i) forming an optical interference image by combining different portions of an optical wave front reflected from multiple surfaces; ii) recording an interference signal at different locations of the optical interference image in response to varying a property of the optical wave front that causes pairs of the multiple surfaces that have different optical path separations to contribute differently to the interference signal; iii) transforming the interference signal for at least one of the locations to produce a spectrum having a peak at a spectral coordinate corresponding to each pair of the multiple surfaces; and iv) identifying the spectral coordinate of the peak corresponding to a selected pair of the multiple surfaces.

65 Claims, 14 Drawing Sheets

OTHER PUBLICATIONS

P. de Groot, "Chromatic dispersion effects in coherent absolute ranging," Opt. Lett., vol. 17, pp. 898–900, 1992.

Peter de Groot, "Derivation of algorithms for phase–shifting interferometry using the concept of a data–sampling window," Applied Optics, vol. 34, p. 4723, 1995.

Peter de Groot, "Measurement of transparent plates with wavelength–tuned phase–shifting interferometry," Applied Optics, vol. 39, No. 16, pp. 2658–2663, 2000.

Klaus Freischlad, "Fourier Analysis of Phase Shifting Algorithms," Proc. SPIE vol. 3407, pp. 73–85, 1998.

K. Freischlad, "Large flat panel profiler," Proc. SPIE 2862, pp. 163–171, 1996.

J.E.Greivenkamp and J.H.Bruning, "Phase shifting interferometry," Optical Shop Testing, D. Malacara, pp. 501–598, J. Wiley, New York, 1992.

Susumu Kuwamaura and Ichirou Yamaguchi, "Wavelength scanning profilometry for real–time surface shape measurement," Appl. Opt., 36, 4473–4482 (1997).

Okada et al., "Separate measurements of surface shapes and refractive index inhomogeniety of an optical element using tunable–source phase shifting interferometry," Applied Optics, vol. 29, No. 22, pp. 3280–3285, 1990.

M. Suematsu and M. Takeda, "Wavelength–shift interferometry for distance measurements using Fourier transform technique for fringe analysis," Applied Optics, vol. 30, No. 28, pp. 4046–4055, 1991.

Kinoshita M. et al., "Optical Frequency–Domain Imaging Microprofilometry with a Frequency–Tunable Liquid–Crystal Fabry–Perot Etalon Device", *Applied Optics, Optical Society of America,* vol. 38, No. 34, Dec. 1, 1999, pp. 7063–7068.

L. Deck, "Absolute Distance Measurements Using FTPSI With a Widely Tunable IR Laser," Proc. SPIE, 4778, 218–226 (2002).

* cited by examiner

| Order | OPD | fc/fmin |
|---|---|---|
| 1st | $2nT$ | $2q$ |
| | $2L_1$ | $2rq$ |
| | $2L_2$ | $2sq$ |
| | $2L_1+2nT$ | $(2+2r)q$ |
| | $2nT+2L_2$ | $(2+2s)q$ |
| | $2L_1+2nT+2L_2$ | $(2+2r+2s)q$ |
| 2nd | $4L_1$ | $4rq$ |
| | $4nT$ | $4q$ |
| | $4L_2$ | $4sq$ |
| | $4L_1+2nT$ | $(4r+2)q$ |
| | $4L_1+2nT+2L_2$ | $(4r+2+2s)q$ |
| | $4L_1+4nT$ | $(4r+4)q$ |
| | $4L_1+4nT+2L_2$ | $(4r+4+2s)q$ |
| | $2L_1+4nT$ | $(2r+4)q$ |
| | $2L_1+4nT+2L_2$ | $(2r+4+2s)q$ |
| | $2L_1+2nT+4L_2$ | $(2r+2+4s)q$ |
| | $2L_1+4nT+4L_2$ | $(2r+4+4s)q$ |
| | $4nT+2L_2$ | $(4+2s)q$ |
| | $2nT+4L_2$ | $(2+4s)q$ |
| | $4nT+4L_2$ | $(4+4s)q$ |
| | $2L_1+2nT$ | $|2r-2|q$ |
| | $2L_1+2L_2$ | $(2r+2s)q$ |
| | $2L_1-2nT-2L_2$ | $|2-2r-2s|q$ |
| | $2L_1-2L_2$ | $|2r-2s|q$ |
| | $2L_1+2nT-2L_2$ | $|2+2r-2s|q$ |
| | $2nT-2L_2$ | $|2-2s|q$ |
| | $4L_1+4nT-4L_2$ | $(4r+4+4s)q$ |

The OPD and normalized frequency for the 1st order and unique 2nd order frequencies for a four-surface cavity.

FIG. 4

PHASE-SHIFTING INTERFEROMETRY METHOD AND SYSTEM

CROSS-REFERENCE TO RELATED APPLICATIONS

This application is a continuation-in-part application of U.S. application Ser. No. 09/919,511 entitled "Frequency Transform Phase Shifting Interferometry," filed Jul. 31, 2001, which claims priority from U.S. Provisional Application Ser. No. 60/223,803 entitled "Fourier Transform Phase Shifting Interferometry," filed Aug. 8, 2000.

The present application also claims priority from U.S. Provisional Application Ser. No. 60/339,214 entitled "Frequency Transform Phase Shifting Interferometry," filed Dec. 10, 2001, the contents of which is incorporated herein by reference.

BACKGROUND

This invention relates to interferometry, and more particularly to phase-shifting interferometry.

Interferometric optical techniques are widely used to measure optical thickness, flatness, and other geometric and refractive index properties of precision optical components such as glass substrates used in lithographic photomasks.

For example, to measure the surface profile of a measurement surface, one can use an interferometer to combine a measurement wavefront reflected from the measurement surface with a reference wavefront reflected from a reference surface to form an optical interference pattern. Spatial variations in the intensity profile of the optical interference pattern correspond to phase differences between the combined measurement and reference wavefronts caused by variations in the profile of the measurement surface relative to the reference surface. Phase-shifting interferometry (PSI) can be used to accurately determine the phase differences and the corresponding profile of the measurement surface.

With PSI, the optical interference pattern is recorded for each of multiple phase-shifts between the reference and measurement wavefronts to produce a series of optical interference patterns that span at least a full cycle of optical interference (e.g., from constructive, to destructive, and back to constructive interference). The optical interference patterns define a series of intensity values for each spatial location of the pattern, wherein each series of intensity values has a sinusoidal dependence on the phase-shifts with a phase-offset equal to the phase difference between the combined measurement and reference wavefronts for that spatial location. Using numerical techniques known in the art, the phase-offset for each spatial location is extracted from the sinusoidal dependence of the intensity values to provide a profile of the measurement surface relative the reference surface. Such numerical techniques are generally referred to as phase-shifting algorithms.

The phase-shifts in PSI can be produced by changing the optical path length from the measurement surface to the interferometer relative to the optical path length from the reference surface to the interferometer. For example, the reference surface can be moved relative to the measurement surface. Alternatively, the phase-shifts can be introduced for a constant, non-zero optical path difference by changing the wavelength of the measurement and reference wavefronts. The latter application is known as wavelength tuning PSI and is described, e.g., in U.S. Pat. No. 4,594,003 to G. E. Sommargren.

SUMMARY

The invention features methods and systems in which PSI data is transformed into a domain that produces spectrally separated peaks each corresponding to a particular pair of surfaces in an interferometric cavity defined by multiple pairs of surfaces. Each peak provides optical path length and surface reflectivity information about a corresponding pair of surfaces in the cavity. As a result, the interferometric data from such cavities provides simultaneous information about multiple surfaces. For example, information about any particular surface may be determined generically. Furthermore, embodiments of the invention preserve three-dimensional relational characteristics between different profiled surfaces because the information is derived from a single measurement. Moreover, even for cavities formed by a single pair of surfaces, embodiments of the invention do not require the interference to occur at specific frequencies. In particular, information may be determined without the need for a preset phase interval between adjacent data points, the phase interval being associated with a particular cavity length of interest.

To produce the spectrally separated peaks, the interference signal can be phase-shifted using any method that modulates the contribution from cavities of different optical path length at different frequencies. For example, wavelength-tuned PSI data produces such a result because a change in optical frequency induces a corresponding change in interference phase that is proportional to an optical path length (OPL). Similarly, for example, the interference signal can be phase-shifted by varying the inclination angle of the light beam illuminating the cavity.

In embodiments where the phase-shifting is substantially linear in time, the transformation can be a frequency transform (e.g., a Fourier transform) that converts the interference signal from the time domain to the frequency domain. In such cases, each frequency in the transform domain corresponds to a particular OPL. In other embodiments, the interference signal is transformed into the OPL domain. Such a transformation can be achieved by calibrating the phase-shifting component (e.g., the tuning characteristic of a wavelength-tuned source) and compensating the frequency transform for any nonlinearity in the phase-shifting. Alternatively, the phase-shifting can be monitored in real time using, for example, a reference cavity to allow a direct transformation of the interference signal to the OPL domain (which will be referred to subsequently as the OPL-transform).

In addition to determining single and multiple surface profiles, embodiments of the invention are disclosed that use information about multiple surface pairs to determine optical thickness, physical thickness, and homogeneity (i.e., refractive index variations). Moreover, the technique can be used to measure complex optical components such as curved surfaces, high-finesse cavities, prisms, wedges, and multi-component optical assemblies, as well as internal angles, interfaces, and defects in such structures.

In general, in one aspect, the invention features an interferometry method including: i) forming an optical interference image by combining different portions of an optical wave front reflected from multiple surfaces; ii) recording an interference signal at different locations of the optical interference image in response to varying a property of the optical wave front that causes pairs of the multiple surfaces that have different optical path separations to contribute differently to the interference signal; iii) transforming the interference signal for at least one of the locations to produce a spectrum having a peak at a spectral coordinate corresponding to each pair of the multiple surfaces; and iv) identifying the spectral coordinate of the peak corresponding to a selected pair of the multiple surfaces.

Embodiments of the method may include any of the following features.

The multiple surfaces may include at least one reference surface and at least one surface of a test object. Also, for example, the selected surfaces may include multiple surfaces of an optical component or an optical assembly. Moreover, in some embodiments the portion of the wavefront reflected from one of the selected surfaces is directed to that surface via a reflection from an internal surface of the optical component. Similarly, in other embodiments, the portion of the wavefront reflected from one of the selected surfaces is directed to that surface via a reflection from an interface between two components of the optical assembly.

The method may further include, for each location, extracting the spectral phase of the interference signal at the spectral coordinate of the peak corresponding to the selected pair of surfaces. In some embodiments, extracting the spectral phase of the interference signal for each location includes transforming the interference signal for each of the remaining locations with respect to the spectral coordinate of the peak corresponding to the selected pair of surfaces. In other embodiments, extracting the spectral phase of the interference signal for each location includes transforming the interference signal for each of the remaining locations to produce a corresponding spectrum having the peak corresponding to the selected pair of surfaces.

The method may further include determining variations in an optical path distance between the selected pair of surfaces based on variations in the extracted phase for the multiple locations of the optical interference image. Moreover, the method may further include: calculating a surface profile of one of the selected pair of surfaces based on the determined variations; calculating an optical thickness profile between the selected pair of surfaces based on the determined variations; calculating a physical thickness profile between the selected pair of surfaces based on the determined variations; and/or calculating a homogeneity profile between the selected pair of surfaces based on the determined variations.

The interference signal may be recorded at different locations of the optical interference image in response to varying the optical frequency of the optical wave front.

Alternatively, the interference signal may be recorded at different locations of the optical interference image in response to varying the propagation direction (e.g., inclination angle) of the optical wave front. For example, the varying of the propagation direction of the optical wave front may include changing the position of an illumination source point used to produce the optical wave front. Moreover, the varying of the propagation of the optical wave front may include varying the diameter of a ring-shaped light source used to produce the optical wave front.

The spectrum may be produced by transforming the interference signal from a time domain to a frequency domain. Alternatively, the spectrum may be produced by transforming the interference signal into an optical path difference (OPD) domain.

The method may further include monitoring a reference phase from a reference cavity produced in response to an additional portion of the optical wave front. For example, the spectrum may be produced by transforming the interference signal into an optical path difference domain (OPD) based on the monitored reference phase. In such embodiments, the spectrum S may corresponds to $S(D) = |OPLT(D)|^2$, where D is a variable for optical path difference and OPLT(D) is an OPD transform, which can be expressed as:

$$OPLT(D) = \sum_{j=0}^{N-1} I_j W_j \exp\left(-i\varphi_{Mj}\frac{D}{D_M}\right)\Delta\varphi_{Mj},$$

where there are N increments to the varying of the optical wave front property, j is an index for the N increments, $I_j$ is the interference signal at increment j, $W_j$ is a value for a weighting function at increment j, $D_M$ corresponds to an optical path length of the reference cavity, $\varphi_{Mj}$ is the monitored reference phase at increment j, and $\Delta\varphi_{Mj}$ is an increment in the monitored reference phase corresponding to increment j. In some embodiments, the weighting function is not used, e.g., $W_j=1$. The method may further include determining an optical path difference between the selected pair of surfaces from the OPD coordinate of the corresponding peak. This OPD determination can be done for one or more of the locations. The method may also include, for each location, extracting the spectral phase of the interference signal at the spectral coordinate of the peak corresponding to the selected pair of surfaces, the extracted phase $\varphi_T$ may be calculated from $\varphi_T(D_T)=\arg[OPLT(D_T)]$, where $D_T$ is the spectral coordinate of the peak.

Recording the interference signal may further include monitoring intensity variations in the optical wave front during the varying of the property of the wave front and compensating the interference signal for the intensity variations.

The method may further include calculating information about surface reflectivity for at least one of the selected pair of surfaces based on amplitudes of at least some of the peaks in the spectrum.

The selected pair of surfaces may be surfaces of a high-finesse cavity. For example, the surfaces of the high-finesse cavity may have a reflectivity greater than about 70%.

The method may further include determining whether or not a defect is present between the selected pair of surfaces based on the spectrum at each of the multiple locations. The presence of the defect can correspond to an additional peak in the spectrum of at least one of the multiple locations. For example, the selected pair of surfaces can be the front and back surfaces of an optical component, and the defect may be an air bubble in the optical component or an impurity in the optical component.

The method may further include identifying the spectral coordinate of the peak corresponding to a second selected pair of the multiple surfaces. Moreover, the method may further include, for each location, extracting the spectral phase of the interference signal at the coordinate of the peak corresponding to the first selected pair of surfaces and the coordinate of peak corresponding to the second selected pair of surfaces. For example, the selected surfaces may include multiple surface of an optical component (e.g., a prism). Also, for example, the selected surfaces may include multiple surfaces of an optical assembly, where one of the multiple surfaces is an interface between two components of the optical assembly.

In further embodiments, the selected pairs of surfaces may include a first reference surface, a first surface of an optical component, and a second reference surface, wherein one of the wave front portions is directed to the second reference surface via a reflection from at least one internal surface of the optical component. In such cases the method may further include determining an angular orientation of the internal surface of the optical component relative to the first surface of the optical component based on the extracted phases. Also, the method may further include determining an internal angle of the optical component based on the extracted phases, where the at least one internal surface includes two internal surfaces defining the internal angle. For example, the optical component can be a prism (e.g., a right-angle prism). In some embodiments, the right-angle prism has two internal surfaces defining a nominal right angle, and the at least one internal surface includes the two internal surfaces defining the nominal right angle and the first surface of the optical component is a front face of the right-angle prism. In other embodiments, the right-angle prism has two surfaces defining a nominal right angle, and the at least one internal surface is a hypotenuse surface connecting the two surfaces defining the nominal right angle and the first surface of the optical component is one of the two surfaces defining the nominal right angle.

In another aspect, the invention features an optical assembly method including: attaching a first optical component to a second optical component to produce an optical assembly; interferometrically characterizing the optical assembly using the interferometry method described above; and reseting the first optical component relative to the second optical component based on the interferometric characterization.

In general, in another aspect, the invention features a method for determining a presence of a defect in an optical component. The method includes: i) forming an optical interference image by combining different portions of an optical wave front reflected from multiple surfaces, wherein the multiple surfaces include at least one surface of the optical component; ii) recording an interference signal at different locations of the optical interference image in response to varying a property of the optical wave front that causes pairs of the multiple surfaces that have different optical path separations to contribute differently to the interference signal; iii) transforming the interference signal for at least one of the locations to produce a spectrum having a peak at a spectral coordinate corresponding to each pair of the multiple surfaces; and iv) determining whether the defect is present in the optical component based on the spectrum, wherein the defect corresponds to an anomalous peak in the spectrum for at least one of the locations. For example, the defect may include an air bubble in the optical component, an impurity in the optical component, and/or a region of imperfect coupling between two sub-components of the optical component.

In general, in another aspect, the invention features a system including: i) a light source including a modulation component configured to vary a property of an optical wave front derived from the light source; ii) an interferometer which during operation directs different portions of the optical wave front to multiple surfaces and recombines the different portions to form an optical interference image; iii) a multi-element photo-detector positioned to record an interference signal at different locations of the optical interference image in response to the variation of the optical wave front property by the modulation component, wherein the variation of the wave front property causes pairs of the multiple surfaces that have different optical path separations to contribute differently to the interference signal; and iv) an electronic controller coupled to the light source and the photo-detector, wherein during operation the electronic controller: transforms the interference signal for at least one of the locations to produce a spectrum having a peak at a spectral coordinate corresponding to each pair of the multiple surfaces; and identifies the spectral coordinate of the peak corresponding to a selected pair of the multiple surfaces.

Embodiments of the system may include any of the following features.

The interferometer may include at least one reference surface, where the multiple surfaces include the at least one reference surface and at least one surface of a test object (e.g., an optical component or assembly).

The electronic controller may extract the spectral phase of the interference signal at the spectral coordinate of the peak corresponding to the selected pair of surfaces for each of the different locations. For example, the controller may extract the spectral phase of the interference signal for each location by transforming the interference signal for each of the remaining locations to produce a corresponding spectrum having the peak corresponding to the selected pair of surfaces. Alternatively, for example, the controller may extract the spectral phase of the interference signal for each location by transforming the interference signal for each of the remaining locations with respect to the spectral coordinate of the peak corresponding to the selected pair of surfaces. Also, the controller may further determine variations in an optical path distance between the selected pair of surfaces based on variations in the extracted phase for the multiple locations of the optical interference image.

The light source may be a frequency tunable light source, the modulation component may be a driver that varies an output frequency of the light source, and the property of the wave front varied by the modulation component may be the frequency of the wave front.

Alternatively, the modulation component may be configured to vary an inclination angle of the wave front incident on the multiple surfaces, and the property of the wave front varied by the modulation component may be the inclination angle. For example, the modulation component can be configured to vary the inclination angle by changing a position of an illumination source point of the light source. Furthermore, the light source may be configured to produce a ring-shaped output and the modulation component may be configured to vary a diameter of the ring-shaped output.

The controller may produce the spectrum by transforming the interference signal from a time domain to a frequency domain. Alternatively, the controller produces the spectrum by transforming the interference signal into an optical path difference (OPD) domain.

The interferometer may include a reference cavity and a detector for monitoring a reference phase from the reference cavity produced in response to an additional portion of the optical wave front. In such embodiments, the controller may produce the spectrum by transforming the interference signal into an optical path difference domain (OPD) based on the monitored reference phase. For example, the spectrum S may correspond to $S(D)=|OPLT(D)|^2$, where D is a variable for optical path difference and $OPLT(D)$ is an OPD transform, which can be expressed as:

$$OPLT(D) = \sum_{j=0}^{N-1} I_j W_j \exp\left(-i\varphi_{Mj}\frac{D}{D_M}\right)\Delta\varphi_{Mj},$$

where there are N increments to the varying of the optical wave front property, j is an index for the N increments, $I_j$ is the interference signal at increment j, $W_j$ is a value for a weighting function at increment j, $D_M$ corresponds to an optical path length of the reference cavity, $\varphi_{Mj}$ is the monitored reference phase at increments j, and $\Delta\varphi_{Mj}$ is an increment in the monitored reference phase corresponding to increment j. Note that in some embodiments, the weighting function is not used, e.g., $W_j=1$. The controller may further determine an optical path difference between the selected pair of surfaces from the OPD coordinate of the corresponding peak. This OPD determination can be done for one or more of the locations. The controller may also, for each location, extract the spectral phase of the interference signal at the spectral coordinate of the peak corresponding to the selected pair of surfaces, where the extracted phase $\phi_T$ may be calculated from $\phi_T(D_T)=\arg[OPLT(D_T)]$, where $D_T$ is the spectral coordinate of the peak.

The controller may monitor intensity variations in the optical wave front during the variation of the wave front property and compensates the interference signal for the intensity variations.

The controller may calculate information about surface reflectivity for at least one of the selected pair of surfaces based on amplitudes of at least some of the peaks in the spectrum.

The controller may determine whether or not a defect is present between the selected pair of surfaces based on the spectrum at each of the multiple locations. The presence of the defect may correspond to an additional peak in the spectrum of at least one of the multiple locations.

The controller may further identify the spectral coordinate of a peak corresponding to a second selected pair of the multiple surfaces. Moreover, for each location, the controller may extract the spectral phase of the interference signal at the coordinate of the peak corresponding to the first selected pair of surfaces and the coordinate of the peak corresponding to the second selected pair of surfaces.

In such embodiments, the interferometer may include a first reference surface and a second reference surface, where the multiple surfaces include the first and second reference surfaces and a first surface of an optical component, and where the interferometer is configured to direct one of the wave front portions to the second reference surface via a reflection from at least one internal surface of the optical component. Furthermore, the controller may further determine an angular orientation of the internal surface of the optical component relative to the first surface of the optical component based on the extracted phases. Also, the controller may further determine an internal angle of the optical component based on the extracted phases, where the at least one internal surface includes two internal surfaces defining the internal angle.

In general, in another aspect, the invention features a system for determining a presence of a defect in an optical component. The system includes: i) a light source including a modulation component configured to vary a property of an optical wave front derived from the light source; ii) an interferometer which during operation directs different portions of the optical wave front to multiple surfaces and recombines the different portions to form an optical interference image; iii) a multi-element photo-detector positioned to record an interference signal at different locations of the optical interference image in response to the variation of the optical wave front property by the modulation component, wherein the variation of the wave front property causes pairs of the multiple surfaces that have different optical path separations to contribute differently to the interference signal; and iv) an electronic controller coupled to the light source and the photo-detector, wherein during operation the electronic controller: transforms the interference signal for at least one of the locations to produce a spectrum having a peak at a spectral coordinate corresponding to each pair of the multiple surfaces; and determines whether the defect is present in the optical component based on the spectrum, wherein the defect corresponds to an anomalous peak in the spectrum for at least one of the locations. For example, the light source may be a frequency tunable light source, the modulation component may be a driver that varies an output frequency of the light source, and the property of the wave front varied by the modulation component may be the frequency of the wave front.

Embodiments of the invention can include any of the following advantages.

Phase shifting interferometry can be performed with linear or non-linear phase shift increments. Some embodiments of the invention can measure surface reflectivities for the cavity surfaces, and/or characterize high-finesse cavities. Some embodiments of the invention can also locate defects within or on optical components, in three dimensions. Some systems and methods of the invention can also perform internal angle measurements, and can characterize multi-component optical assemblies. Characterizing multi-component optical assemblies can include, for example, assessing the integrity of interfaces between components, orientation of components, detect defects within components, and can calibrate/assess wear on the assembly (parts of the assembly) by comparing measurements made before and after deployment and use of the assembly.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety. In case of conflict, the present specification, including definitions, will control.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is a table showing first- and second-order frequencies produced by a four-surface cavity.

Like reference symbols in the various drawings indicate like elements.

DETAILED DESCRIPTION

Figure 1:
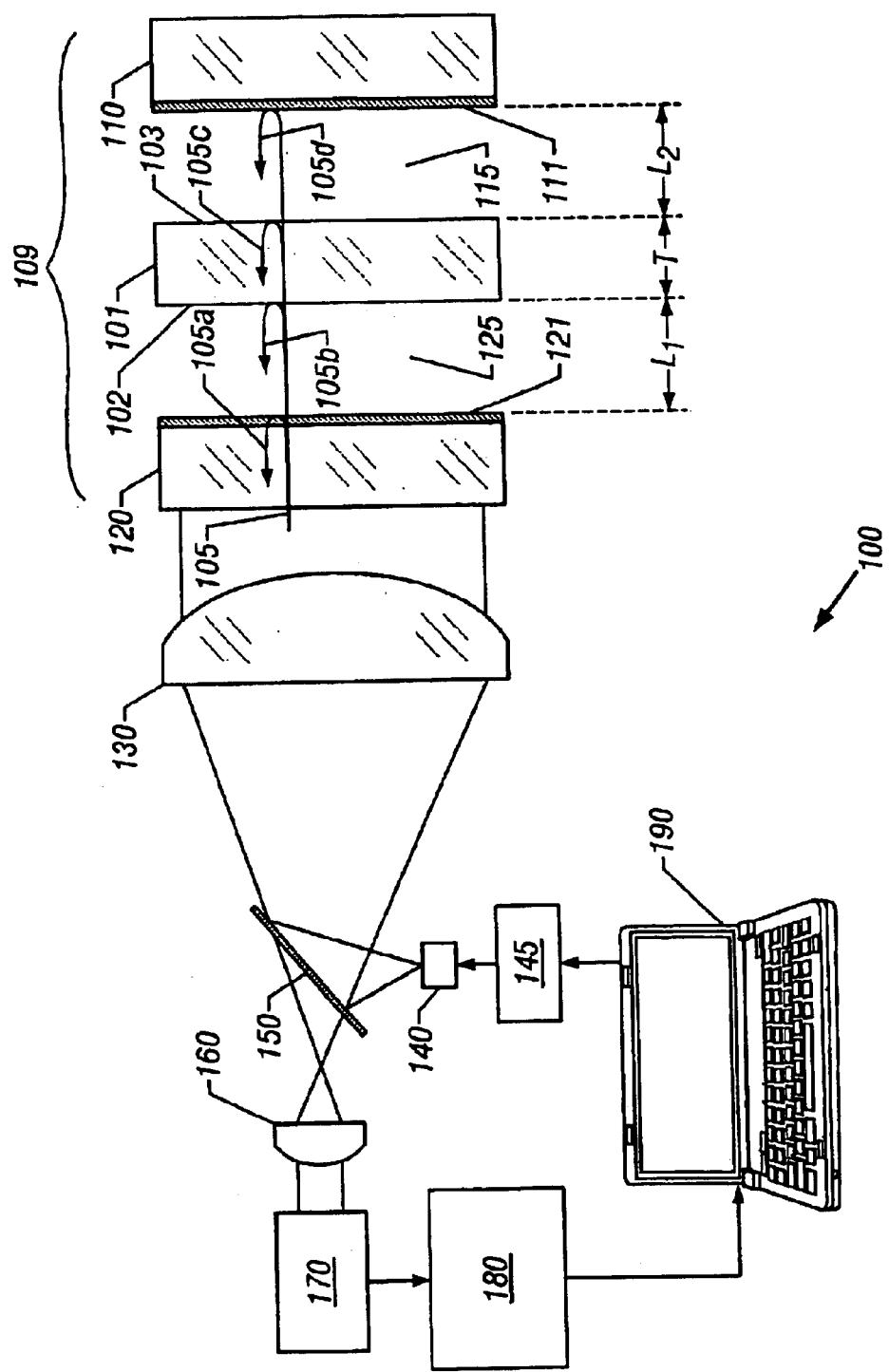
FIG. 1 is a schematic diagram of an interferometer apparatus having a cavity with multiple surface pairs.

The invention features methods and systems that perform phase-shifting interferometry (PSI) using, for example, optical frequency modulation in an unequal path interferometer (e.g., a Fizeau interferometer) to generate phase shifts. The PSI data is transformed (e.g., frequency transformed) to produce spectrally separated peaks (e.g., frequency peaks) each corresponding to a different pair of surfaces in an interferometric cavity defined by multiple pairs of surfaces. Embodiments of the interferometry technique may hereinafter be referred to as Frequency Transform Phase Shifting Interferometry ("FTPSI"). We refer to such embodiments FTPSI regardless of the particular type of transform that is used. For example, the transform may be an OPL transform as described subsequently.

In a two-surface cavity, a change in optical frequency induces a corresponding change in interference phase that is proportional to the optical path length (OPL). Similarly, in a cavity having more than two surfaces, the multiple reflective surfaces will give rise to interference patterns that have different phase shifts for the same change in optical frequency. Each of the different phase shifts corresponds to the optical path difference between each surface pair (i.e., elemental two-surface cavity) within the cavity. As a result, wavelength-tuned interferometric data from such cavities may be transformed into the frequency domain (e.g., by a using a Fourier transform) to produce a set of spectrally separated frequency peaks. Each such peak corresponds to a particular pair of surfaces in the cavity and provides optical path length information about the pair of surfaces. Moreover, embodiments of the invention may be configured so that the interference phase-shift frequencies for each surface pair in the interferometer are distinct from one another.

The peak frequency of each cavity can be determined from knowledge of the nominal optical thickness of the cavity and the nominal optical frequency tuning rate. Alternatively, the peak frequency of each cavity can be obtained from the frequency-transformed interferometric data. The interferometric phase of each cavity can be determined from the discrete Fourier transform of the interference data, evaluated approximately at the peak frequency. The interferometric phase distribution (or phase map) across each cavity can be used to determine, for example, the optical thickness variation of each cavity. Furthermore, in some embodiments, phase maps can be used to determine the refractive index variation (i.e., the transverse variation of the refractive index) and physical thickness variation of a transparent measurement object in a cavity.

Moreover, by first acquiring high-resolution frequency spectra of the frequency transformed data, one can determine correspondingly accurate values of the peak frequencies of each cavity. Such accurate values of the peak frequencies enable measurements of the absolute optical thickness of each cavity. In some embodiments, this allows the determination of absolute physical thickness and absolute refractive index values of measurement objects in the cavity.

A schematic diagram of such an interferometer system 100 is shown in FIG. 1. System 100 is adapted to measure the optical interference between reflections from the front surface 102 and back surface 103 of a transparent measurement object 101 (e.g., an optical flat. The optical interference measured includes contributions from additional reflections from surfaces 111 and 121 of reference objects 110 and 120, respectively. For example, reference objects 110 and 120 may be reference flats having well-characterized surfaces. More generally, however, the references surfaces defined by surfaces 111 and 121 need not be well-characterized. Surface 102 is separated from surface 121 by a gap 125, and surface 103 is separated from surface 111 by another gap 115. System 100 includes a mount for positioning object 101 relative to reference objects 110 and 120, and a computer 190. System 100 additionally includes a tunable light source 140 (e.g., a laser diode), a driver 145 connected to light source 140 for adjusting the optical frequency of its output, a beam splitter 150, a collimating optic 130, an imaging optic 160, a CCD camera 170, and a frame grabber 180 for storing images detected by camera 170. In some embodiments, a single device can perform both control and measurement functions (e.g., frame grabber 180 may be incorporated in computer 190). Driver 145 tunes the optical frequency $\nu$ of light source 140, through a frequency range $\Delta\nu$ about a nominal optical frequency of $\nu_0$.

During operation, controller 190 causes driver 145 to control the optical frequency of light emitted by light source 140 and causes frame grabber 180 to store an image of the optical interference detected by CCD camera 170 for each of the specified optical frequencies. Frame grabber 180 sends each of the images to controller 190, which analyzes them using a PSI algorithm. In some embodiments, driver 145 linearly modulates the optical frequency of the light source 140 as the series of interference images are being recorded. Alternatively, in other embodiments, the driver can modulate the optical frequency in discrete steps or according to other functions.

During operation, light source 140 directs light having an optical frequency $\nu$ to beam splitter 150, which then directs the light to collimating lens 130 to collimate the light into a plane field. Optionally, a second beamsplitter (not shown) directs a portion of the light to an optical frequency monitor, described further below with reference to FIG. 5. Surface 121 reflects a first portion of the light to form a first reference wavefront 105a, and surfaces 102 and 103 of object 101 reflect additional portions of light to form wavefronts 105b and 105c respectively. Surface 111 also reflects a portion of light to form a second reference wavefront 105d. Lenses 130 and 160 then image wavefronts 105a, 105b, 105c, and 105d onto CCD camera 170 where they form an optical interference pattern. The optical interference pattern also includes contributions from higher order reflections within cavity 109. Higher order reflections include, for example, interference between light reflecting from surface 121 and light that reflects first off surface 102, then by surface 121, and then again by surface 102.

In the analysis that follows, we first consider the optical interference pattern produced by optical frequency tuning in an elemental two-surface interferometer cavity, for example, the cavity formed by surface 121 and surface 102. The surfaces are separated by a physical gap L and contain a medium with a refractive index n. For example, the gap can be filled with air, which has a refractive index of about one. The product of refractive index and gap thickness, nL, is referred to as the optical thickness (for air this is about equal to the physical thickness, L). The total phase difference, $\phi$, between light rays with wavenumber k reflected from surface 102 and light rays which reflect from surface 103 p times is given by:

$$\varphi(x, y) = 2pknL(x, y) + \Phi = 2pnL(x, y)\frac{2\pi\nu}{c} + \Phi, \quad (1)$$

where ν is the optical frequency of the light, c is the speed of light, and Φ is an overall constant phase. The x and y dependence of gap L and phase φ are shown explicitly in EQ. 1 to show the spatial variation in phase. In some embodiments, refractive index n may also have an x and y dependence. Extraction of this phase variation profile, or phase map, is the information that is typically of interest in PSI. This explicit x and y dependence will be omitted in the equations that follow for the sake of clarity.

Tuning the source optical frequency, ν, produces an interferometric phase variation, $\dot\varphi$, that depends on the optical frequency tuning rate, $\dot\nu$, and the cavity optical path difference 2pnL as $$\dot\varphi = \frac{4\pi}{c}\frac{pnL\dot\nu}{}[1+\eta], \quad (2)$$

where the dot represents differentiation with respect to time. The term $$\eta = \frac{\nu}{n}\frac{\partial n}{\partial \nu}$$

is due to the index chromatic dispersion (variation of the index with wavelength). Accounting for the index chromatic dispersion may increase measurement accuracy, particularly for absolute measurements. The cavity interference therefore varies at a frequency $f_c$, which is given by $$f_C = \frac{2pnL\dot\nu}{c}[1+\eta]. \quad (3)$$

Accordingly, in an elemental cavity, multiple reflection events produce interference at frequencies that are harmonics of the 1$^{st}$ order (i.e., p=1) frequency.

In some embodiments, frequency $f_c$ can be determined from EQ. 3 if nominal values for the optical thickness, nL, and optical frequency tuning rate, $\dot\nu$, are known. In addition, the frequency $f_c$ can be identified by transforming the interference intensity data measured by CCD camera 170 into the frequency domain (e.g., by using a Fourier transform). This transform produces a frequency spectrum and identifies the frequency of the corresponding peak in the spectrum.

Once $f_c$ has been determined, and for substantially linear frequency tuning, the interferometric phase of any elemental cavity can be recovered from the complex amplitude of the Discrete Fourier Transform (DFT) of the interference, evaluated at the representative first-order frequency, $f_c$, for that cavity:

$$\varphi = \tan^{-1}\left(\frac{\text{Im}(DFT(f_C))}{\text{Re}(DFT(f_C))}\right), \text{ where} \quad (4)$$

$$DFT(f_C) = \sum_{j=0}^{N-1} I_j W_j \exp\left[i\frac{2\pi j f_C}{f_S}\right]. \quad (5)$$

In EQ. 5, $I_j$ is the intensity sample measured at the j$^{th}$ frequency of the optical frequency tune. N is the total number of intensity samples acquired. $W_j$ are the sampling weights associated with a Fourier window, W, and $f_s$ is the sampling rate. Fourier window, W, is usually selected to suppress contributions to the phase evaluation from additional frequencies far from $f_c$, and from the effect of finite observation intervals. Examples of Fourier windows include Hamming windows and Tukey windows. The Tukey window can be advantageous in embodiments having one or more additional frequency peaks close to $f_c$ as the taper width of the window can be chosen to effectively zero-weight these additional frequencies at $f_c$.

Extraction of the phase, φ, for each CCD pixel gives a phase distribution φ(x, y) (i.e., phase map) for the cavity. Variations in optical thickness (i.e., the relative optical thickness) can be determined from EQ. 1. Moreover, for the case where the surface profile of the reference surface 121 is already known, the phase distribution can be used to determine the surface profile of surface 102. It is noted that the results of the phase extraction defined by EQs. 4 and 5 generates phases modulo 2π. These phase ambiguities can be accounted for in the phase map using conventional 2π phase ambiguity unwrapping techniques, commonly known in the art.

The phase extraction analysis discussed above provides the relative information about the cavity (i.e., variations from pixel to pixel). It is also possible to determine absolute information about the cavity. According to EQ. 3, one can determine the absolute optical thickness nL from the first-order peak frequency $f_c$, the frequency tuning rate $\dot\nu$ and the chromatic dispersion. The accuracy of this determination, however, depends on the accuracy with which $f_c$ and $\dot\nu$ can be determined. Moreover, the x and y dependence of the absolute optical thickness nL can be determined by separately identifying the first-order frequency $f_c$ from interference intensity data corresponding to each pixel of CCD camera 170.

In some embodiments, a high-resolution frequency spectrum of a small portion of the cavity (e.g., corresponding to one CCD pixel) can be obtained in order to accurately determine $f_c$. From this, an accurate value for the absolute optical thickness of the cavity can be determined for that portion of the cavity. Using data from the same measurement, a low-resolution frequency spectrum of the entire cavity can be obtained. Using EQ.'s 4 and 5, this information can be used to determine the relative phase map and relative optical thickness variation of the cavity. The absolute optical thickness of the entire cavity can then be determined by referencing the variation in relative optical thickness to the absolute optical thickness determined for the small portion of the cavity. Parameters affecting the frequency spectrum resolution and spectral resolution limit are discussed below.

The analysis above adequately describes the situation where object 101 is opaque, and only the reflections from surface 102 of object 101 need be considered. However, in some embodiments, object 101 is transparent, and reflections from surfaces 121, 102 and 103 should be considered. In the analysis that follows, reflections from surface 111 of reference flat 110 will be ignored. For example, reference flat 110 can be removed. There are now three 1$^{st}$ order elemental two-surface cavities corresponding to surface pairs 121 and 102, 121 and 103, and 102 and 103, respectively. Surface 121 and surface 102 are separated by a distance L (i.e., gap 125). In what follows, gap 125 is assumed to be filled with air and have a refractive index equal to one. Object 101 has a thickness T and a refractive index n. Assume that the interferometer is configured so that all elemental cavities have unique OPL's. The $1^{st}$ order frequencies are then spectrally separated and the interferometric phase of any elemental cavity can be extracted using the frequency decomposition and phase extraction given by EQ.'s 4 and 5. Thus, both the relative and absolute optical thickness profiles can be made simultaneously for multiple elemental cavities.

To accurately determine the peak frequency $f_c$ for each cavity, it is necessary to spectrally resolve each peak of interest. The spectral resolution limit of a Fourier decomposition is inversely proportional to the observation time, hence the minimum resolvable interference frequency is $$f_{min} = \frac{1+\mu}{\Delta t} = \frac{(1+\mu)f_S}{N}. \qquad (6)$$

All first order frequencies should be separated by $f_{min}$ to be resolved. The parameter $\mu$ is introduced as a practical matter. The theoretical resolution limit occurs when $\mu=0$, but in practice, the minimum resolvable frequency should be somewhat larger to account for potential instrumental deficiencies and phase error sensitivities.

Setting $f_c = f_{min}$, EQ. 3 implies that the minimum resolvable optical path difference for a tuning range of $\Delta\nu_{max}$ is given by $$\Gamma = \frac{c(1+\mu)}{\Delta\nu_{max}}. \qquad (7)$$

This turns out to be, for example, 3.75 millimeters for an 80 gigahertz maximum tuning range if $\mu=0$. The primary cavity gaps should be greater than the limits imposed by EQ. 7 in order to separate the first order frequencies. Furthermore, if it is desired to accurately determine the first-order peak frequencies for absolute measurements, the tuning range should be larger than that required by EQ. 7.

The analysis methodology adopted can now be summarized: the interferometer cavity is constructed to create a unique OPL for each elemental cavity, thereby assuring unique interference frequencies via EQ. 3. The interferogram is then sampled while the optical frequency is varied. The interferogram recorded at each pixel may then be spectrally decomposed with a frequency transform, such as a Fourier transform, and the $1^{st}$ order frequency peaks corresponding to the elemental cavities identified from the transformed data. Finally the spatial phase distribution at each frequency peak of interest is extracted using EQ. 4 and EQ. 5.

In some embodiments, frequency transforms at the specific $1^{st}$ order frequencies using EQ. 5 are applied to the data to evaluate the phase map (using EQ. 4) of each elemental cavity separately. The phase maps can be used to determine information such as, for example, the surface profile of one or more of the cavity surfaces, and/or the relative optical thickness of one or more of the elemental cavities.

Alternatively, or in addition, the peak frequency values themselves can be used to determine the absolute optical thickness of the corresponding cavity provided the tuning range provides sufficient resolution. Information about the optical thickness and optical thickness variation of each cavity can be combined to determine a complete absolute optical thickness profile of each cavity.

The optical thickness may also be determined by the phase change, $\Delta\phi$, during a known optical frequency change, $\Delta\nu$. The optical thickness is calculated from EQ. 2, as $$nL = \frac{\Delta\varphi}{\Delta\nu}\frac{c}{4\pi(1+\eta)}, \qquad (8)$$

assuming $\Delta\phi$ and $\Delta\nu$ are measured over the same time interval, $\Delta t$, and the derivatives, $\dot\phi$ and $\dot\nu$ can be approximated by the difference equations $$\frac{\Delta\varphi}{\Delta t} \text{ and } \frac{\Delta\nu}{\Delta t},$$

respectively.

Figure 2:
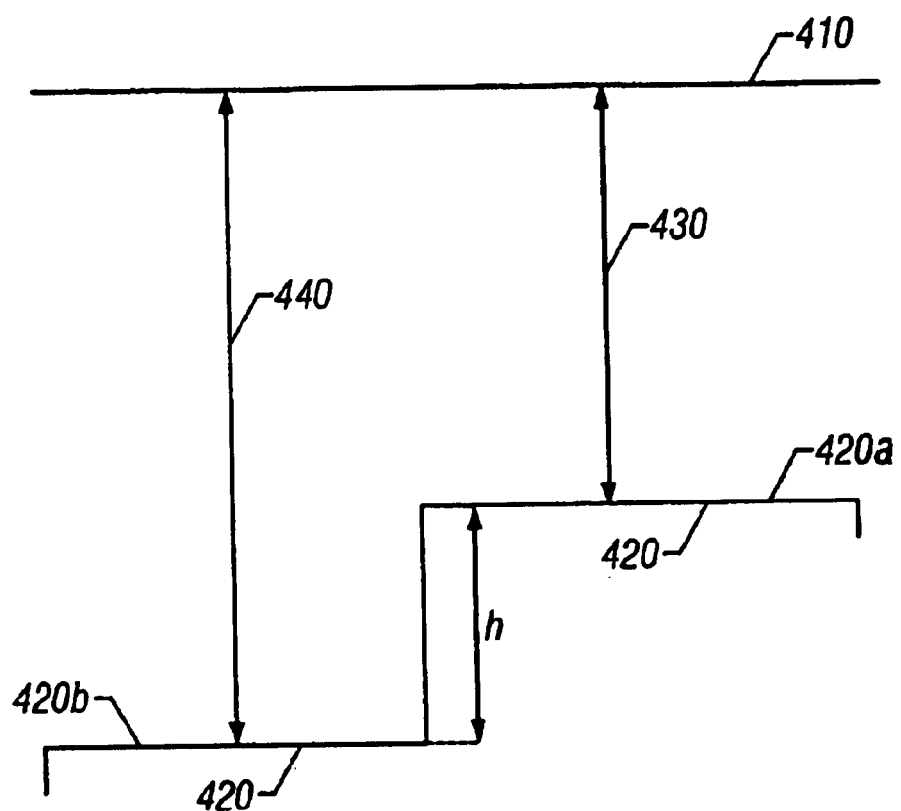
FIG. 2 is a schematic diagram of an interferometer cavity involving discontinuous surfaces.

In some embodiments, FTPSI can be used to determine the surface profile of a discontinuous surface, for example a stepped surface. For instance, consider side 420 of an object shown in FIG. 2. Side 420 has two parallel surfaces 420a, and 420b, offset by a height, h. Surfaces 420a and 420b are substantially parallel to reference flat surface 410. Surface pairs 410 and 420a, and 410 and 420b are separated by gaps 430 and 440, respectively.

FTPSI analysis of side 420, as described above, will yield different peak frequencies for the gaps 430 and 440. Surface profiles for surfaces 420a and 420b can be obtained by analysis of each cavity's spectra as described above. Additionally, the step height between surfaces 420a and 420b can be found by comparing the optical thickness variation of gaps 430 and 440. Of course, this information can be obtained for discontinuous surfaces in cavities having more than two surfaces.

The analysis above can be further extended to treat a four-surface cavity, such as four-surface cavity 109 shown in FIG. 1. This cavity produces six $1^{st}$ order elemental two-surface cavities. For brevity, the cavity bounded by surface 102 and 103, for example, is denoted 102:103. Hence the six $1^{st}$ order elemental cavities are 121:102, 121:103, 121:111, 102:103, 102:111, and 103:111, respectively. The values of the primary gaps 125 and 115 must be chosen so that all the elemental cavities have unique OPL's, and hence unique $1^{st}$ order frequencies. Gap 125 has a length $L_1$ (this was denoted as L in the three-surface cavity treatment) and gap 115 has a length $L_2$.

Resolvable $1^{st}$ order frequency peaks enables the user to extract the spatial phase variation and hence the relative optical thickness for each cavity according to EQs. 4 and 5. Furthermore, provided the optical frequency tuning rate $\dot\nu$ is known and the frequencies are resolved to a sufficient accuracy, the absolute optical thickness of each respective cavity can be determined using EQ. 3.

Moreover, it is possible to determine the refractive index variation, or homogeneity, of object 101 using the information obtained by FTPSI analysis. The index variation can be obtained with high precision, assuming nominal values for the index $\bar n$ and plate thickness $\bar T$ are available. From EQ. 1, the total phase observed at each primary cavity correspond to:

$$\phi_{121:102}=2kL_1$$

$$\phi_{102:103}=2knT,$$

$$\phi_{103:111}=2kL_2 \quad (9)$$

where $$k = \frac{2\pi\nu}{c}.$$

A similar equation is found for the phase variation of the 121:111 cavity with object 101 removed:

$$\phi_{121:111}=2k(L_1+T+L_2). \quad (10)$$

Solving for the refractive index of object 101, n, yields $$n = \frac{\varphi_{102:103}}{\varphi_{121:111} - \varphi_{103:111} - \varphi_{121:102}}. \quad (11)$$

Since these phases represent total phases, and not the $2\pi$ modulo phases obtained from the DFT, we can write for any cavity $$\phi=2k\bar{n}\bar{L}+\varphi, \quad (12)$$

where $\bar{n}$ and $\bar{L}$ are nominal values of the index and gap, and $\varphi$ is the local phase deviation from the total phase. Substituting EQ. 12 for each of the individual phases in EQ. 11 produces $$n = \frac{2k\bar{n}\bar{T} + \varphi_{102:103}}{2k\bar{T} + \varphi_{121:111} - \varphi_{103:111} - \varphi_{121:102}}. \quad (13)$$

For cases where $2k\bar{T}\gg\varphi_{121:111}-\varphi_{103:111}-\varphi_{121:102}$, and ignoring terms of $$\frac{1}{2k\bar{T}}$$

higher than first order, the index variation of object 101, $\Delta n=n-\bar{n}$, is given by $$\Delta n = \frac{\varphi_{102:103} - \bar{n}(\varphi_{121:111} - \varphi_{103:111} - \varphi_{121:102})}{2k\bar{T}}. \quad (14)$$

The $\varphi$'s are determined from their respective modulo-$2\pi$ phase maps, keeping in mind that $\varphi_{121:111}$ is the phase maps of the empty cavity. Determination of the physical thickness variation of object 101, $T-\bar{T}$, follows similarly, or may, for example, be determined directly from EQ. 14 and a measure of the optical thickness variation of object 101.

The phase maps of the primary cavities 121:102, 102:103, and 103:111 are acquired simultaneously in a single measurement. As a result, the relative orientations of the spatial phase variations are preserved. Accordingly, it is possible to determine linear variations in the homogeneity of the object (also called the homogeneity wedge) using the FTPSI analysis described above.

Maintaining identical conditions from measurement to measurement places stringent demands on tuning repeatability and cavity stability. Removal or insertion of object 101 from cavity 109, for example, can introduce changes in the physical alignment of reference surfaces 121 and 111. This, in turn, can lead to errors in the measured homogeneity of object 101. In some embodiments, cavity 109 can be prepared such that the aperture presented by object 101 is smaller than the observable aperture of the cavity. In this case, a portion of cavity 109 will be a two-surface cavity, while the portion including object 101 will be a four-surface cavity. The portion corresponding to the two-surface cavity can function as a control/calibration for the measurement in which object 101 is removed, as any variation in the optical path length of the 121:111 cavity in these areas will correspond to a change in the alignment of flats 120 and 110. Any changes in the pitch and yaw of the system between the two measurements can be compensated for in the analysis.

It is also possible to determine the absolute refractive index and the absolute physical thickness of object 101 from the four surface cavity measurement. The phase variation for each of the primary cavities are given by:

$$\dot{\varphi}_{121:102} = \frac{4\pi\dot{\nu}L_1}{c}, \quad (15a)$$

$$\dot{\varphi}_{102:103} = \frac{4\pi\dot{\nu}nT}{c}, \quad (15b)$$

$$\dot{\varphi}_{103:111} = \frac{4\pi\dot{\nu}L_2}{c}, \quad (15c)$$

$$\dot{\varphi}_{121:111} = \frac{4\pi\dot{\nu}(L_1 + T + L_2)}{c}. \quad (15d)$$

Again, EQ. 15d refers to a measurement of the 121:111 cavity made with object 101 removed. Solving for the index yields $$n = \frac{\dot{\varphi}_{102:103}}{\dot{\varphi}_{121:111} - \dot{\varphi}_{103:111} - \dot{\varphi}_{121:102}}. \quad (16)$$

Here the $\dot{\varphi}$ represent the phase variation observed from each cavity under identical cavity and tuning conditions. Using EQ. 15b and EQ. 16, the absolute physical thickness of object 101 can be found via $$T = \frac{c(\dot{\varphi}_{121:111} - \dot{\varphi}_{103:111} - \dot{\varphi}_{121:102})}{4\pi\dot{\nu}} \quad (17)$$

In embodiments where the frequency resolution of the respective first-order peaks is sufficient, absolute measures of homogeneity and physical thickness can be determined from EQs. 16 and 17, respectively, based on EQs. 2 and 3 for each respective cavity. In other embodiments, however, such absolute properties may determined using a phase extraction techniques as described in the following two paragraphs.

In EQs. 16 and 17, both the numerator and denominator have factors that are rates. Typically, a rate can be expressed as a difference equation, for example, $\dot{\varphi}=\Delta\varphi/\Delta t$. Accordingly, one need only calculate the total change in the respective phases of EQ. 16 during the same period the optical frequency is tuned over a specific range $\Delta\nu$ in order to determine the absolute index of object 101. Similarly, one need only calculate the total change in the respective phases of EQ. 17 during the same period the optical frequency is tuned over a specific range $\Delta\nu$ in order to determine the absolute physical thickness of object 101.

An optical frequency monitor can be used to determine the optical frequency tune, $\Delta\nu$. The phase changes can be determined through a Fourier phase extraction technique known as a sliding window phase analysis, whereby a phase is extracted from a Fourier analysis of a windowed subset of the data, and the phase evolution determined as the window is slid in time across the total data set. Accordingly, this typically requires a larger data set than that used for relative optical thickness measurements.

Implementation of the optical frequency monitors may include dimensional stability for repeatable tuning characteristics and feedback signals for real-time control of the optical frequency ramp. Furthermore, the monitor should have resolution that is fine enough for the longest interferometer cavities and yet track the optical frequency over the full tuning range.

As described above, an optical frequency monitor (also referred to herein as a wavelength monitor) may be used to determine the frequency tune $\Delta v$ in EQ. 17. Furthermore, in embodiments based on EQ. 3, accurate knowledge of the frequency tuning rate $\dot{v}$ can be determined using an optical frequency monitor so that the absolute optical thickness of an elemental cavity can be determined from its corresponding first-order frequency. The frequency monitoring can be provided by a monitor cavity with a well-known OPL.

Assuming the monitor cavity has an optical gap given by $D_M$ and experiences a phase variation $\phi_M$ during the tune, EQ. 17 may be rewritten as:

$$T = \frac{D_M(\dot{\varphi}_{121:111} - \dot{\varphi}_{103:111} - \dot{\varphi}_{121:102})}{\dot{\varphi}_M}. \quad (18)$$

The monitor cavity can additionally relax the linear tuning requirement for the DFT evaluation described above in EQ. 5. This is achieved by calculating the phase shift increment between each sample directly from the monitor phase variation. For example, consider a test cavity having an OPL $D_T$, and a monitor cavity having a fixed OPL $D_M$. The DFT used to measure the test phase is $$DFT(f_c) = \sum_{j=0}^{N-1} I_j W_j \exp(i\Delta\varphi_{Tj}) \quad (19)$$

where $\Delta\phi_{Tj}$ is the overall interferometric phase shift of the test cavity for time sample j. For a constant optical tuning rate $\dot{v}$, $$\Delta\varphi_{Tj} = \frac{2\pi \dot{v} D_T}{c}. \quad (20)$$

For a non-constant $\dot{v}$ the interferometric phase shift of the test cavity for time sample j can be determined from the monitor via $$\Delta\varphi_{Tj} = \Delta\varphi_{Mj} \frac{D_T}{D_M}. \quad (21)$$

EQs. 19–21 recognize that the frequency spectrum of the transformed FTPSI data is equivalent to an optical path length spectrum. By directly measuring the phase of the monitor cavity signal it is possible to transform the FTPSI data directly to an OPL domain. This additionally lifts the requirement by EQ. 4 and 5 of linearity on the wavelength tune. This transformation of the FTPSI data directly to an OPL spectrum, referred to as an OPL Transform (OPLT), can be formalized as follows. We start with the integral representation of the Fourier transform.

$$F(f) = \int_{-\infty}^{\infty} I(t)W(t)\exp(-i2\pi ft)dt \quad (22)$$

where I(t) is the intensity variation, W(t) is the window function and $f$ is the frequency being analyzed. In an interferometer, the frequency 71 is the test cavity interference frequency given by $$f = \frac{\dot{v} D_T}{c} \quad (23)$$

where $D_T$ is the OPL of the test cavity. Consider an FTPSI apparatus that includes a monitor cavity having a known fixed OPL $D_M$. The monitor allows one to measure $\dot{v}$, which is common to both cavities.

$$\dot{v} = \frac{c f_M}{D_M} \quad (24)$$

Combining EQ. 22, 23 and 24 we obtain, $$F(D_T) = \int_{-\infty}^{\infty} I(t)W(t)\exp\left(-i2\pi \frac{D_T}{D_M} f_M t\right)dt. \quad (25)$$

Noting that the monitor phase evolution $\phi_M$ is $$\phi_M = 2\pi f_M t. \quad (26)$$

and affecting the change of variables $t \to \phi_M$ $$F(D_T) = \int_{-\infty}^{\infty} I(\varphi_M)W(\varphi_M)\exp\left(-i\frac{D_T}{D_M}\varphi_M\right)d\varphi_M. \quad (27)$$

Converting from continuous time to discrete time signals we obtain the OPLT, $$OPLT(D_T) = \sum_{j=0}^{N-1} I_j W_j \exp\left(-i\varphi_{Mj}\frac{D_T}{D_M}\right)\Delta\varphi_{Mj}. \quad (28)$$

Analogously to the linear wavelength tune case, an OPL spectrum S can now be generated from the intensity time history of a single pixel in the test cavity (the calibration pixel) via;

$$S(D_T) = |OPLT(D_T)|^2. \quad (29)$$

Each peak corresponds to the OPL of a particular cavity. Once the peaks in the spectrum are identified, the phase at each pixel at a particular OPL peak position determines the spatial phase variation of the corresponding cavity. The spatial phase variation is calculated analogously to EQ. 4 using $$\phi_T(D_T) = \arg[OPLT(D_T)] \quad (30)$$

for each pixel in the test region, where $\arg[OPLT(D_T)]$ refers to the function that returns the complex amplitude phase of the OPL peak at $D_T$.

FTPSI algorithms often assume a constant beam intensity. For many light sources, this is an approximation as the beam intensity often varies as a function of many internal and external parameters, e.g., drive current and/or temperature. Due to the spectral selectivity of FTPSI, it can be less sensitive to intensity variations than most PSI algorithms, as long as the frequency content of the variation is far enough away from the interference frequency of interest. It is also possible to eliminate this potential source of error during analysis. The first thing to note is that given a (real) amplitude variation r common to two interfering electric field amplitudes a and b, the interference is proportional to $r^2$;

$$(ra+rb)(ra+rb)^* = r^2(|a|^2+|b|^2+a^*b+ab^*). \quad (31)$$

So if we can measure the variation, it is simple to divide it out. The standard photodetector transimpedence amplifier model provides insight into how this can be done. The standard model assumes the generated photocurrent $i_O$ and (constant) leakage current $i_L$ are multiplied by a fixed transimpedence gain G to produce the observed voltage;

$$V(t) = Gi_O(t) + Gi_L. \quad (32)$$

The second term results in a fixed voltage offset, called the pedestal. We assume here that the digitization process produces at most an additional fixed offset that can be added to the pedestal.

Assume a monitor detector measures the beam intensity variation $V_M(t)$ by sampling the beam before it enters the interferometer cavity. Sampling the detector with the light source turned off measures the pedestal $O_M$. An interference signal, S(t), measured by a cavity detector (i.e. the camera 170) can then be corrected for beam intensity variations via $$S(t)_{Corrected} = \frac{S(t) - P}{V_M(t) - O_M}, \quad (33)$$

where P is the pedestal of the cavity detector. This formula requires that the pedestals of both the intensity monitor and cavity detector be measured and these can be obtained simultaneously by acquiring data with the laser turned off. Note that EQ. 33 rescales the cavity data depending on the value of $V_M(t)$. This is not a problem for the FTPSI analysis since the phase and frequency (OPL) information are usually scale independent. However, some of the basic instrument functions may be scale dependent—such as light level control and pixel saturation checks. These functions should precede application of EQ. 33.

In some embodiments, the intensity variation information may be obtained from the wavelength monitor, which may eliminate the need for a separate intensity detector. In a situation where the time dependence of intensity variations in the wavelength tune mimic the cavity interference signal, a wavelength monitor provides a way to measure the intensity variation as long as these variations occur with a time dependence that is sufficiently far from the time dependence of the monitor cavity interference. Consider a monitor consisting of a fixed length interference cavity. The time dependence of the monitor contrast C(t) during the tune can be determined (for example, by a sliding window discrete Fourier transform analysis) via $$C(t) = C(f(t)) = \left| \sum_{j=0}^{N-1} I_j W_j \exp(i2\pi f(t)j/f_s) \right| \quad (34)$$

where $f_s$ is the sample frequency, N points are used in the subaperture Fourier window, Wj are the window coefficients and $f(t)$ is the time dependent frequency of interference. The contrast function C(t) is proportional to the intensity variation and can be used to correct for this variation if we assume that both the reference and test beams are influenced identically. To this end we define an intensity independent interference signal $$I'_j = I_j/C_j \quad (35)$$

And use this signal in place of $I_j$ in all the analysis (EQ. 29 and 30).

Optical frequency monitors can be included in any part of the optical path of system 100 (see FIG. 1). For example, the monitor cavity can correspond to two reference surfaces placed before, after, or surrounding measurement object 101. In particular, for example, the monitor cavity can be cavity 121:111, defined by reference flats 120 and 110. Alternatively, a beam splitter may be positioned to direct a small portion of the light from source 140 directly into a separate monitor cavity.

Figure 3:
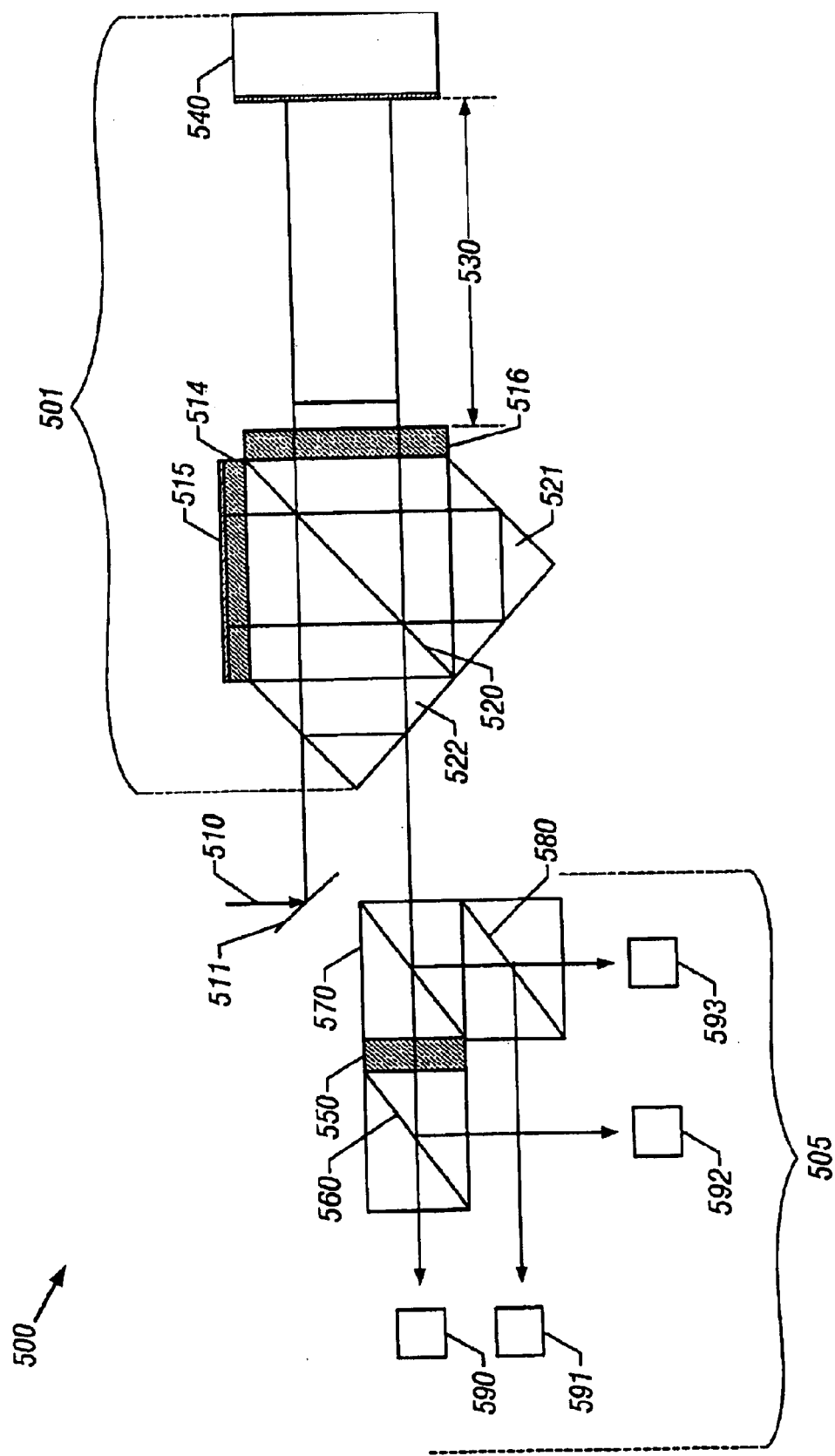
FIG. 3 is a schematic diagram of a wavelength monitor for use with the interferometer apparatus of FIG. 1.

An example of an optical frequency monitor, monitor 500, is shown in FIG. 3. Monitor 500 is a homodyne interferometer that includes a high stability plane mirror interferometer (HSPMI) 501 and a quadrature detector 505. HSPMI 501 includes a polarizing beamsplitter 520, reflectors 515 and 540, quarter-wave plates 514 and 516, corner cube retro-reflector 521, and roof prism (or split retro-reflector) 522. Quadrature detector 505 includes four detectors 590, 591, 592, and 593, beamsplitter 570, polarizing beamsplitters 560 and 580, and quarter-wave plate 550. The whole assembly is ideally mounted on a low expansion plate, for example, one formed from Zerodur or Invar. If necessary, the plate can be thermally controlled with a resistive heater element.

A polarized input beam from light source 140 is directed into HSPMI 501 via reflector 511. Roof prism 522 is positioned below the plane of the page, such that the input beam to the interferometer passes over it. In some embodiments, the input beam is linearly polarized at 45°, or it can be circularly polarized. Beamsplitter 520 splits the input beam into orthogonally polarized reference and measurement beams. The reference beam is twice directed between mirror 515 and cube-corner retro-reflector 521 before being directed to roof prism 522. Similarly, the measurement beam is twice directed between mirror 540 and cube-corner retro-reflector 521. Following the second pass to mirrors 515 and 540, respectively, cube-corner retro-reflector 521 lowers the reference and measurement beams to the plane of roof prism 522, which causes the beams to make two additional passes to mirrors 515 and 540. Thereafter, the beams are recombined into an output beam, which is directed to quadrature detector 505.

The beamsplitting plane of the Quadrature detector 505 is oriented at 45° relative to the two polarizations emitted from HSPMI 501. It therefore mixes the polarizations and produces a beam containing an interference signal proportional to the OPL of the monitor and the optical frequency tuning rate. Quadrature detector 505 further produces four replicas of the interference beam with the interference phase of each replica shifted by 90 degrees. By monitoring the intensity, $D_x$ (where x refers to the detector), of each replica during the tune, the phase of the monitor cavity can be determined as $$\phi = \arctan\left[\frac{D_{590} - D_{592}}{D_{593} - D_{591}}\right], \quad (36)$$

from which the overall interferometric phase shift at each time sample can be determined.

In other embodiments, the optical frequency monitor is not limited to the homodyne interferometer described above.

Generally, any monitor capable of determining optical frequency and optical frequency tuning rate to the required accuracies during the FTPSI measurement process is acceptable. For example, a heterodyne interferometer could perform this function.

In all embodiments, it is important that the $1^{st}$-order frequencies of interest are isolated from all other interference frequencies generated by the interferometer, including frequencies generated by multiple interference cavities (p>1 in EQ. 3). This is achieved through specific interferometer geometries. The following outlines a procedure for specifying the interferometer geometry that usually ensures sufficient isolation for all frequencies out to $2^{nd}$-order (p=2 in EQ. 3). A 4-surface interferometer is used as an example but the procedure is applicable to interferometers of any number of surfaces.

Consider the four surface cavity of system 100. The four surfaces produce six $1^{st}$ order frequencies and twenty-seven $2^{nd}$ order frequencies from 14 topologically distinct beam paths. Six of the twenty-seven $2^{nd}$ order frequencies are identical to the $1^{st}$ order frequencies and cannot be separated, but these contribute only an overall DC shift to the phase evaluation. The $1^{st}$ order frequencies are not all independent, so it is not necessary to measure all six, however to be general, all six frequencies are positioned to minimize the interference from neighboring $2^{nd}$ order frequencies and each other. In terms of the primary gaps, the effective OPL's for the six $1^{st}$ order cavities and the twenty-one different $2^{nd}$ order cavities are given in the $2^{nd}$ column of the table shown in FIG. 4. The gaps given in the table can be used with EQ. 3 to obtain the interference frequencies.

It is convenient to express the primary OPL's in terms of the minimum resolvable OPL, $\Gamma$, as defined in EQ. 7. We define the ratio q as $$q = \frac{nT}{\Gamma}, \quad (37)$$

and the ratio's of the lengths, $L_1$ and $L_2$, of the primary gap's 125 and 115, respectively, to object 101 optical thickness, nT, are expressed as $$r = \frac{L_1}{nT} = \frac{L_1}{\Gamma q} \quad (38a)$$

$$s = \frac{L_2}{nT} = \frac{L_2}{\Gamma q}. \quad (38b)$$

Using EQ.'s 3, 6, and 7, we can normalize the interference frequencies $f_c$ with respect to $f_{min}$ and can express these normalized frequencies as functions of r and q. The normalized independent $1^{st}$ and $2^{nd}$ order frequencies for the three-surface cavity are listed in the third column of the table in FIG. 4. All these frequencies scale with q, so the tuning range is adjusted to cancel this dependence:

$$\Delta v = \frac{\Delta v_{max}}{q}. \quad (39)$$

If nT is assumed to be the smallest optical gap, a search for values of r and s greater than one that maximizes the separation of the $2^{nd}$ order from the $1^{st}$ order frequencies reveals that r=3, s=9 is one such combination. In general, a complete analysis shows that optimal cavity geometries are geometries in which the ratio of the optical path lengths of any two primary gaps is a unique power of three. A similar analysis follows if a different primary gap is assumed to be the smallest.

With the tuning range, $\Delta v$, and the gaps, $L_1$ and $L_2$, now fixed, it remains only to determine the number of samples, N, to be taken. This is selected such that the largest $2^{nd}$ order frequency (i.e., (4r+4+4s)q corresponding to OPL $4L_1+4nT+4L_2$) after being aliased to lower frequencies, is still greater than the largest $1^{st}$ order frequency by at least twice the spectral resolution limit. This constraint, for the four-surface cavity, predicts $$N=(1+\mu)(6r+8+6s), \quad (40)$$

which evaluates to 80 samples if $\mu=0$, for example.

Figure 5:
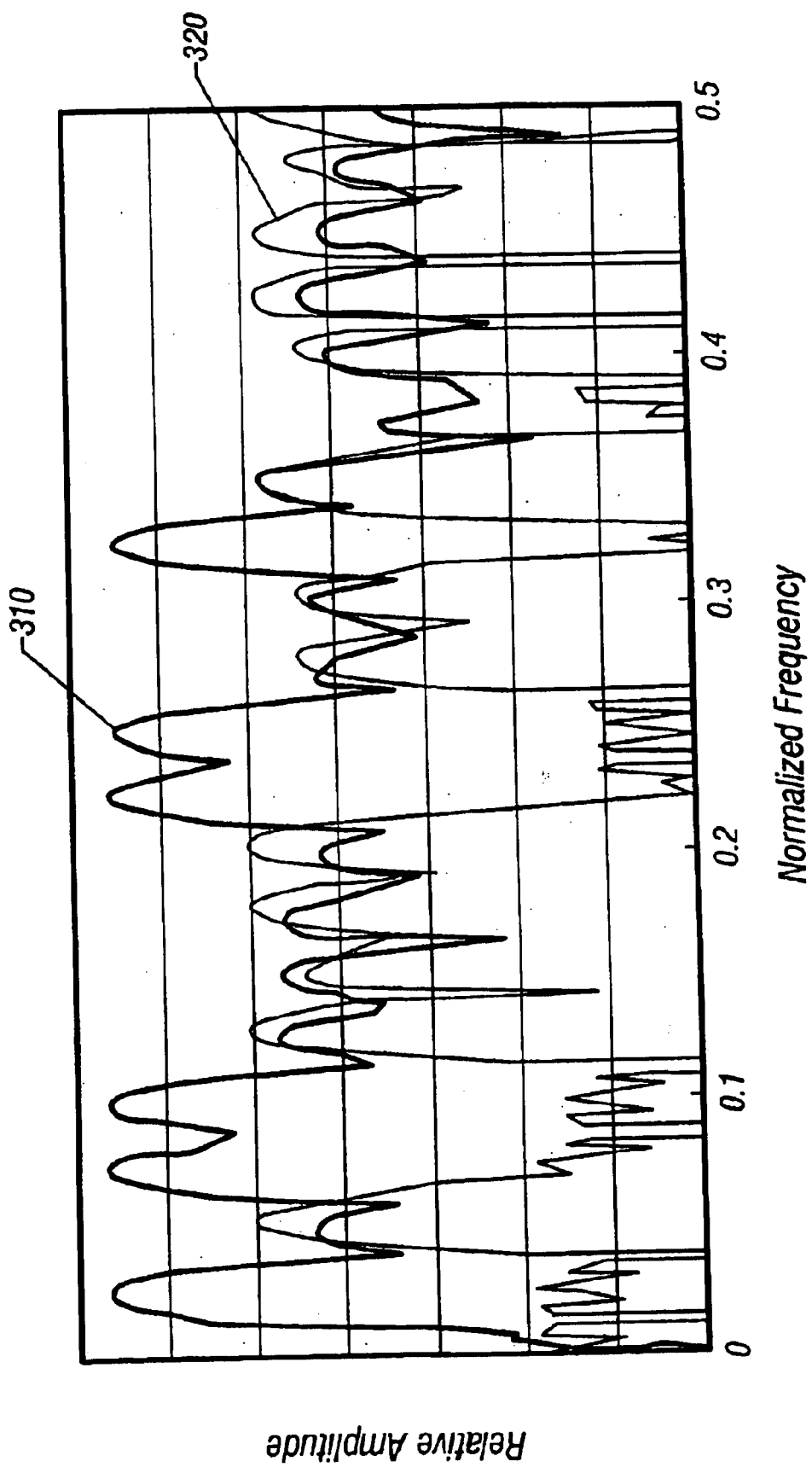
FIG. 5 is a graph shown the relative amplitude of first- and second-order frequencies produced by a four-surface cavity.

EQs. 39 and 40, and with r=3 and s=9, together define an optimum cavity geometry and $1^{st}$ order frequencies. FIG. 5 shows the interference spectrum 310 predicted for this configuration. The spectrum of $2^{nd}$ order cavity frequencies 320 is also shown to highlight the excellent separation between the $1^{st}$ and $2^{nd}$ order peaks.

In general, there are infinitely many possible configurations of a four surface cavity that yield optimal $1^{st}$ order frequency separation. These correspond to cavities in which the ratios r and s are $3^x$ and $3^y$, respectively, where are x and y are integers, and $x \neq y \neq 0$. Another possible configuration is one in which r and s are both scaled by a constant greater than one.

Of course, the invention is not limited to configurations of the cavity surfaces having optimal configurations. In some embodiments, some of the elemental cavities (e.g., the cavities of interest) are optimally configured. The other elemental cavities can be non-optimally configured. For example, the other elemental cavities can be configured to have non-optimal OPL's that are substantially different to the OPL's of the cavities of interest.

In the descriptions above, FTPSI was explained with reference to two-surface, three-surface, and four-surface cavities. The invention, however, is not so limited. This analysis can be extended to cavities with any number of surfaces. A cavity with any arbitrary number of surfaces can be reduced to a combination of the elemental two-surface cavities corresponding to each surface pair. As long as the frequencies of the phase-shifts corresponding to the two-surfaced cavities of interest can be resolved and are sufficiently isolated from other frequencies, the analysis will produce useful information about that cavity.

The light source for the phase-shifting interferometry system can be a laser such as a gas, solid-state, tunable dye or semiconductor laser. The light source can also be a white-light source with a tunable narrow-band spectral filter. Furthermore, in some embodiments the light source can operate at multiple nominal optical frequencies to resolve phase cycling ambiguities in the extracted phase profiles. For example, the light source could operate adjustably between the multiple lines of a HeNe, Argon, or diode laser, or between the different ITU grid frequencies in a commercially available tunable telecom laser. Also, in some embodiments the light source can be coupled to the interferometer by an optical fiber. The optical frequency tuning of the light source can be accomplished internal or external to the light source. For example, the cavity length of a laser light source can be thermally or by piezo-mechanically modulated, to adjust the optical frequency of the laser output. Similarly, the injection current to the gain medium of a laser light source can be modulated to adjust the optical frequency of the laser output. Alternatively, for example, the optical frequency output of the light source can be adjusted externally by acousto-optic, electro-optic, or opto-mechanical modulation.

In some embodiments, the light source for the PSI system can be a polarized light source (e.g., linearly polarized light).

For example, system 100 can include a polarizing element in order to polarize the light from the lightsource. Each of the above-described measurement techniques can be performed as a function of the polarization state of the light. For example, the refractive index measurement technique could be performed for multiple different known polarization states (at least two polarization states, e.g., orthogonal polarization states). Variations in the refractive index, optical thickness, or relative optical thickness of object 101 as a function of polarization can be related to the optical anisotropy of object 101. Accordingly, in some embodiments FTPSI techniques can be used to characterize the optical anisotropy (e.g., birefringence, dichroism, etc.) of a test object or cavity.

In some embodiments, it may be important to know the absolute wavelength of the light. For example, in a relative measurement, the error in the profile is directly proportional to the error in the wavelength. When using a telecom laser (e.g., a 1550 nm diode laser), the laser module often contains a device called a mode-locker, which locks the laser onto a particular wavelength in the ITU (International Telecommunications Union) grid. Typical absolute accuracies are +/−1 GHz (accuracy to 5 ppm), which is usually sufficiently accurate.

The ability to measure absolute length via wavelength tuning can be used to measure absolute wavelength. This is described by way of the following example. First, measure the absolute length of a two surface cavity, then change the cavity length while tracking the change in phase of the interference (e.g., count fringes). Once the absolute length of the cavity is known, measure the absolute length of the cavity again. The wavelength during the time the cavity length was changed is given by $$\lambda = 4\pi \frac{\Delta L}{\Delta \varphi}.$$

Furthermore, although phase-shifting system 100 in FIG. 1 included a Fizeau interferometer, other embodiments can employ an interferometer of a different type such as Twyman Green, Mach Zehnder, Michelson, Fabry-Perot, and grazing-incidence or unbalanced Mirau. Also, the interferometer can be a large aperture, microscope, or fiber optic sensor interferometer.

In general, the measurement object can take on many forms. For example, the measurement object can be an optical flat, a photomask, a flat-panel display, or a silicon wafer (which could involve infrared illumination). Furthermore, the measurement object can be a cemented optic or an air-spaced optical assembly. The measurement object can also be or include a spherical or aspherical dome, contact lens, meniscus lens, or spectacle lens. Typically, the measurement object is transparent or partially transparent at the wavelength of the light source. More generally, the measurement object is any structure, e.g., micro-machined silicon, which offers optical information relating to surface and/or bulk features of the object. This optical information can relate to the topography of a selected surface of the measurement object or to the optical profile including refractive index homogeneities of all or a selected portion of the measurement object. Examples of different measurement objects are discussed in more detail below.

Furthermore, although the frequency transform used in the above-described analysis is a Fourier transform, the invention is not so limited. Embodiments may also implement other types of frequency transforms, such as Hilbert transforms.

While the above-described examples discuss phase shifting an interference signal by optical frequency tuning, embodiments of the invention are not so limited. In general, the interference signal can be phase-shifted using any method that modulates the contribution from cavities of different optical path length at different frequencies. For example, the interference signal can be phase-shifted by varying the inclination angle of the light beam illuminating the cavity. Embodiments utilizing such phase-shifting methods include those described in commonly owned U.S. patent application Ser. No. 09/848,055 entitled "Apparatus and Method for Reducing the Effects of Coherent Artifacts" and filed May 3, 2001, which is incorporated by reference herein, in its entirety. An example of such an embodiment will now be described.

Figure 6:
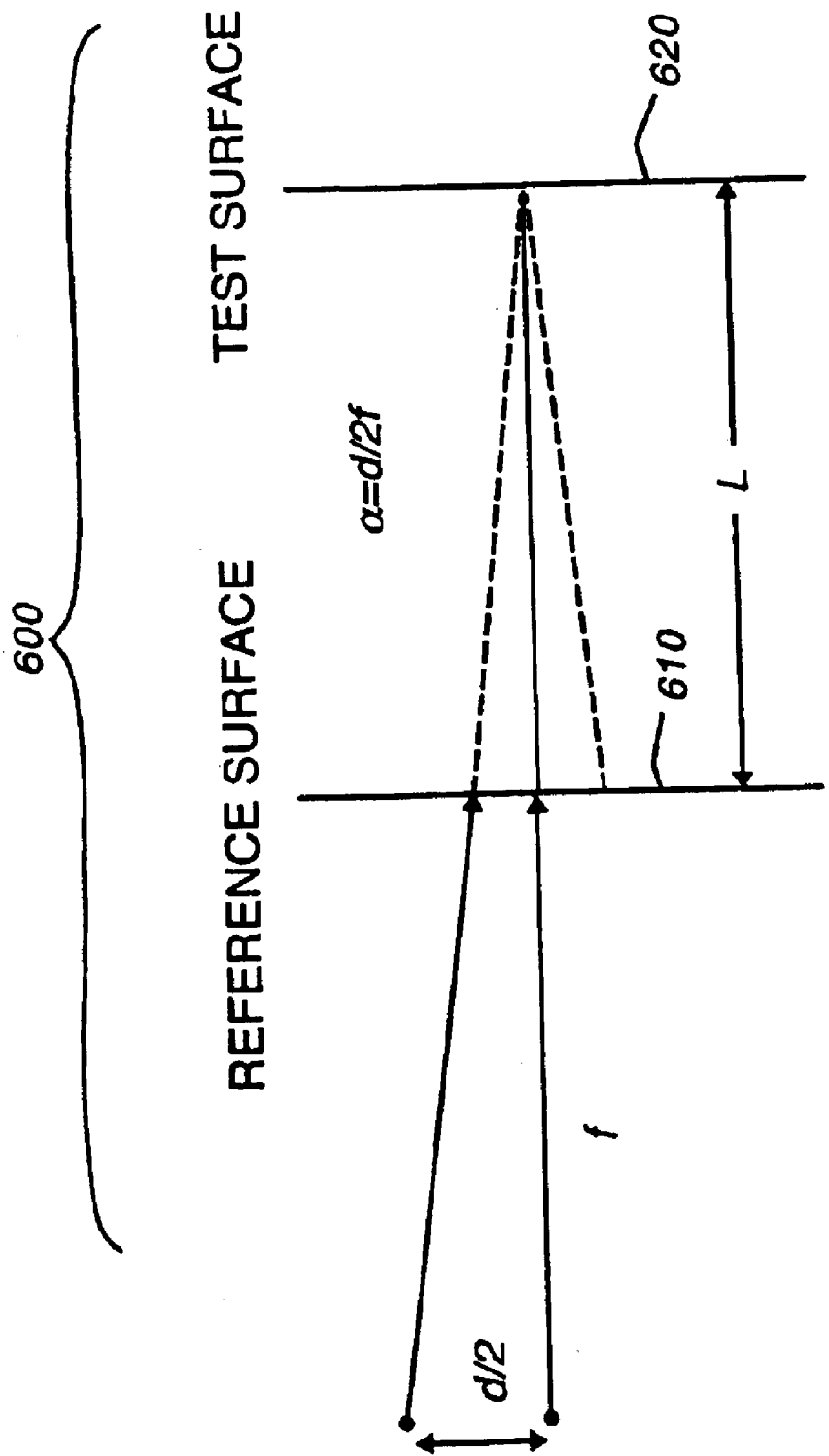
FIG. 6 shows a diagrammatic view for estimating the difference in optical path length (OPL) between interferograms produced by an on-axis test point with illumination from a source point on the edge of a source disk.

Referring to FIG. 6, the OPL of an interferometer 600 with a Fizeau geometry depends on the position, d, of the origin of the illumination source point. Interferometer 6100 has a cavity length L and collimator focal length $f$. The inclination angle, $\alpha$, of the illumination beam is given by $\tan(\alpha)=d/2f$, which, for small $\alpha$, can be approximated by $\alpha=d/2f$. The phase-difference, $\Delta\phi$, between light reflected from reference surface 610 and test surface 620 is a function of the OPL within the Fizeau cavity as well as of the wavelength of the light. The OPL is determined from the distance L between the two surfaces comprising the cavity, as well as the inclination angle $\alpha$. The following holds:

$$\Delta\varphi = \frac{2\pi}{\lambda} \cdot OPD = \frac{2\pi}{\lambda} \cdot 2L\cos(\alpha) \quad (41)$$

It is possible modulate the phase difference $\Delta\phi$, and hence to phase shift any resulting interference signal, by changing the position of the illumination source point and hence inclination angle, $\alpha$, of the illumination beam. For example, refering to the embodiment of FIG. 1, the inclination angle can be varied by translating the position of light source 140 along the direction perpendicular to the optical axis, which changes the propagation direction of the collimated beam emerging from lens 130. A transducer or motor can be used to adjust this tranverse position of the light source relative the optical axis, and thereby vary the inclination angle. The transducer or motor may be used to adjust the position of the light source itself or the position of a subsequent optic or optics (e.g., a pair of wedges) used to redirect the beam.

As disclosed in the 09/848,055 application, a spatially extended source in the shape of a thin ring can be used to minimize the effect of coherent artifacts via spatial averaging. This type of source can also be advantageously used with FTPSI if the concurrent small loss in spatial resolution due to the spatial averaging effect is acceptable. Controlling the diameter of the ring-shaped light source can vary the inclination angle of an illumination beam. For example, the ring-shaped light source can replace source 140 in the embodiment of FIG. 1 and likewise can be positioned in the back focal plane of lens 130.

Figure 7:
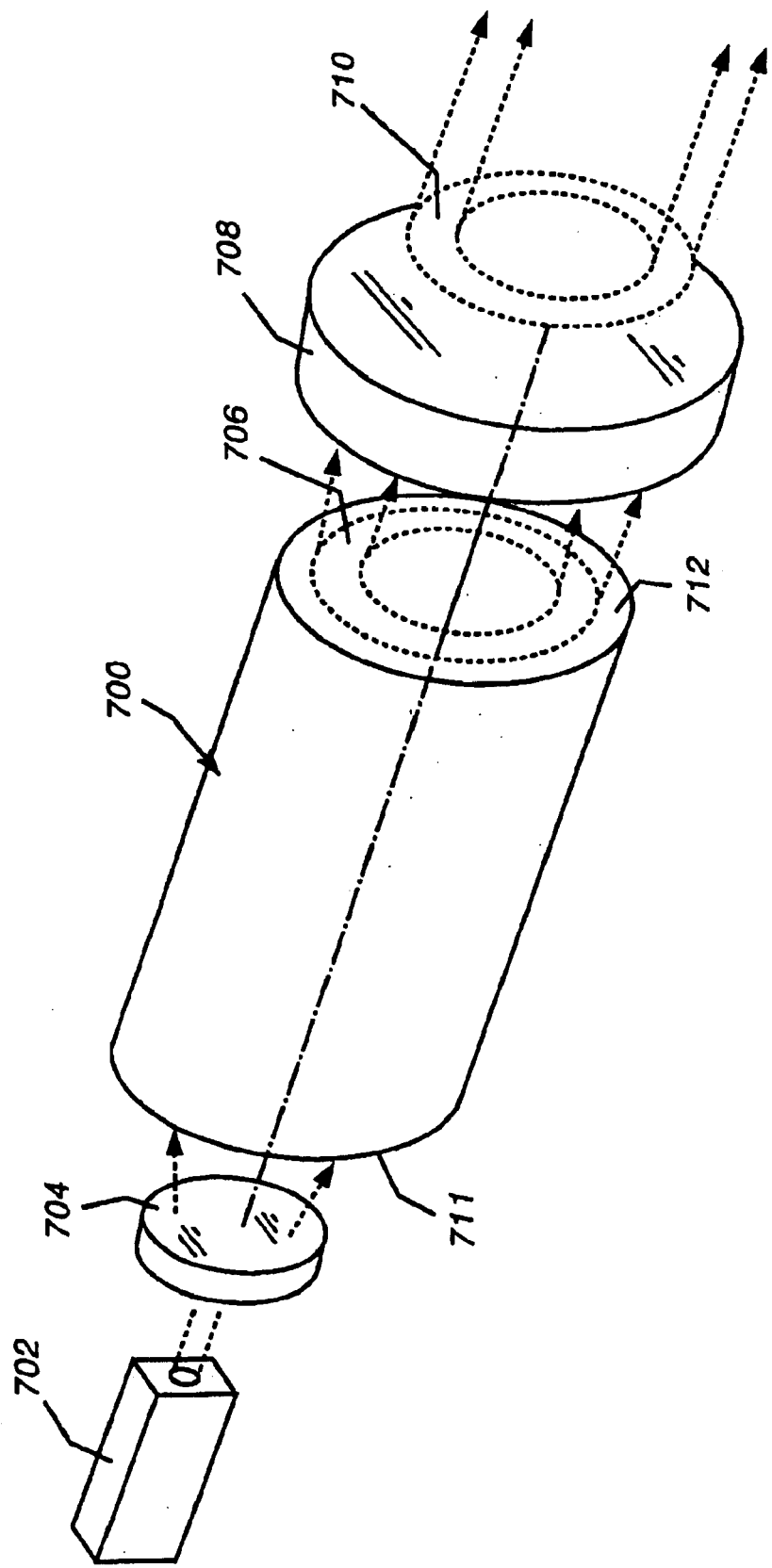
FIG. 7 shows a diagrammatic perspective view of an embodiment of an illumination system for phase shifting by adjusting illumination angle.

Embodiments of the ring-shaped source may include a convergent beam passing through an axicon or diffractive equivalent. By axially shifting the position of the axicon or diffractive equivalent, the diameter of the ring is changed. Another embodiment includes a fiber bundle. Referring to FIG. 7, a multimode fiber bundle 700 can be used for such a light source. Fiber bundle 700 has a circular entrance side 711 but a ring shaped exit side 712. A laser source 702 is imaged onto the fibers entrance facet via a lens system 704. Lens system 704 is designed to control the angle of incidence and numerical aperture match to multimode fiber 700 so as to generate a ring of illumination 706 that can thereafter be further controlled by optical components 708 to provide collimated ring 710. Varying, for example, the conditions under which the laser enters multimode fiber 700, can selectively change the diameter of ring 706.

As described above, FTPSI can be used to measure features such as surface profiles, physical and optical wedge, and relative homogeneity of optical components. So far, this description has used the example of a parallel plate as a test object to illustrate how such measurements are performed. In general, FTPSI can be used to measure and characterize a wide variety of simple and complex optical components. The following description will illustrate some of the functionality of FTPSI by example.

Figure 8:
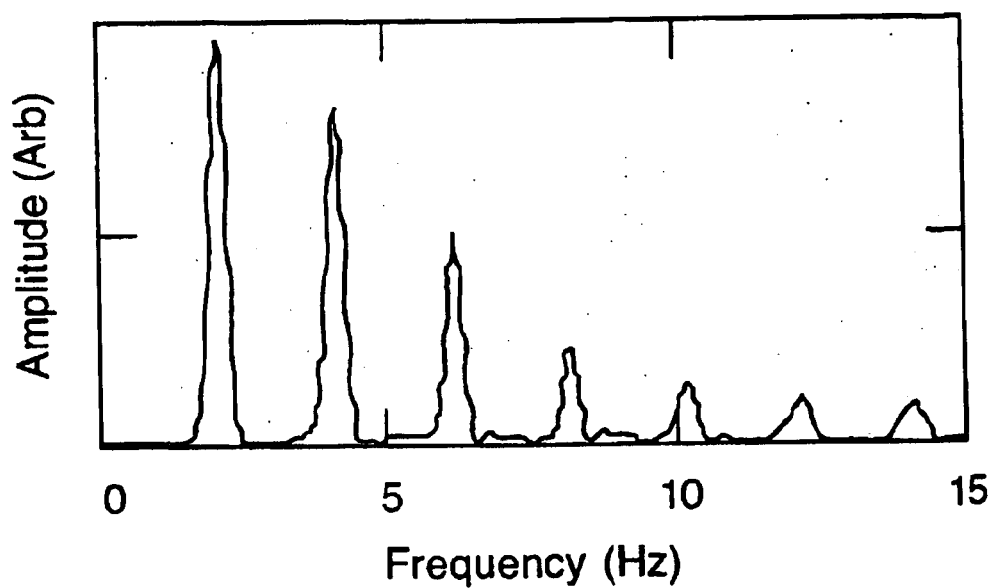
FIG. 8 shows a plot of the interference spectrum from a high finesse cavity.
Figure 9:
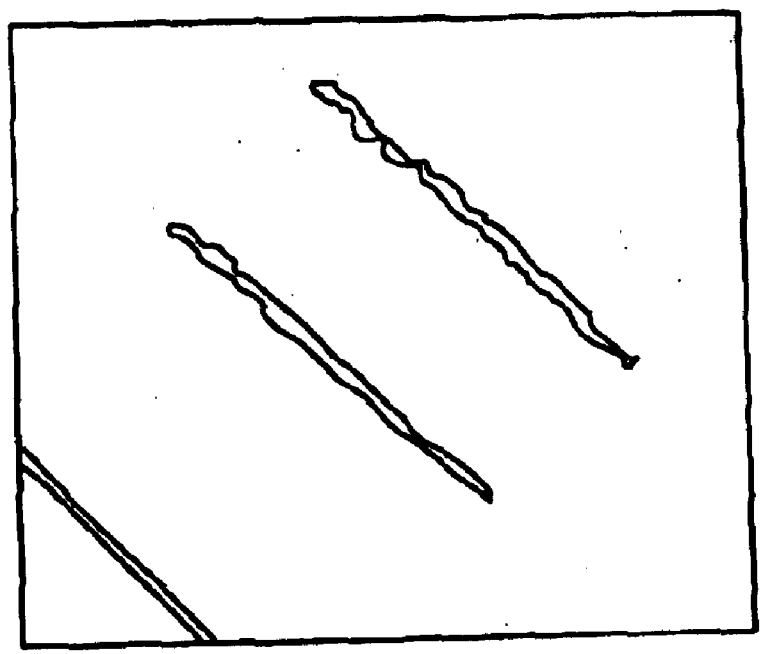
FIG. 9 shows an example of high finesse fringes.

FTPSI can be used to characterize high-finesse cavities. When the reflectivities of surfaces making up an elemental cavity are high (e.g., at least about 10%, about 20%, about 30%, about 40%, about 50%, about 60%, about 70%, about 80%, about 90%, about 95%, and as much as about 99%), the optical power transferred to higher order multiple interference events increases, producing stronger interference at harmonics of the $1^{st}$ order frequency. The distorted fringe pattern produced often confounds conventional PSI algorithms. FTPSI separates these harmonics so that the $1^{st}$ order frequency can be analyzed in isolation, producing substantially distortion free profiles of the surfaces. FIG. 8 shows the frequency spectrum obtained from a high finesse cavity whose interference pattern is shown in FIG. 9.

In the analysis of high-finesse cavities, it is usually important to set the cavity geometry to assure that aliased frequencies straddle the 1st harmonic. We also note that a high-finesse cavity can be characterized by analyzing any of the harmonic frequency peaks or by a combination (e.g., a linear combination) of the results from the analysis of a number of different harmonics.

FTPSI can also be used to profile and characterize curved surfaces (e.g., spherical surfaces or parabolic surfaces). In general, any surface shape can be profiled, provided the interferometer can provide a measurement to the surface that is locally approximately parallel to the surface. In other words, the local wave vector of the measurement wavefront should be approximately perpendicular to the curved measurement surface.

In general, the reference surface can have any shape or curvature. It may be advantageous to use a reference surface that nominally conforms to the shape of the measurement surface, as this can reduce the dynamic range of the system required to perform the measurement.

FTPSI also provides information about the reflectivity of surfaces defining elemental cavities. The amplitude of a first order peak in an FTPSI frequency spectrum provides a measure of the reflectivity of the surfaces defining the corresponding elemental cavity. Consider for example, a three surface cavity (i.e., three surfaces defining three elemental cavities). We label these surfaces $S_1$, $S_2$, and $S_3$. The electric field amplitude of the first order reflection from each surface is $a_1$, $a_2$, and $a_3$, respectively. The interference signal detected at the camera is proportional to the intensity of the superposition of these three field amplitudes. To first order, the intensity of is $$I(t)=a_1^2+a_2^2+a_3^2+2a_1a_2 \cos(\omega_{12}t+\phi_{12})+2a_1a_3 \cos(\omega_{13}t+\phi_{13})+2a_2a_3 \cos(\omega_{23}t+\phi_{23}), \quad (42)$$

where $\omega_{mn}$ and $\phi_{mn}$ refer to the frequency and phase of the AC contribution from the elemental cavity defined by surfaces $S_m$ and $S_n$, respectively. The frequency spectrum of such a signal will clearly exhibit peaks at $\omega_{12}$, $\omega_{13}$, and $\omega_{13}$, with the strength (amplitude) of each peak being proportional to the product of the respective field amplitudes. By comparing the relative amplitude of the primary peaks in the frequency spectrum, a user can obtain information about the relative reflectivity of the corresponding cavity surfaces. For example, the relative amplitudes of the peaks at $\omega_{12}$, $\omega_{13}$, $\omega_{13}$ in Eq. 42 uniquely determine the relative values of reflectivity coefficients $a_1$, $a_2$, and $a_3$. Additionally, normalizing the field amplitudes to the intensity of the input light beam, or comparison to a calibrated reference surface, yields a measure of the absolute reflectivity of each surface.

Figure 10:
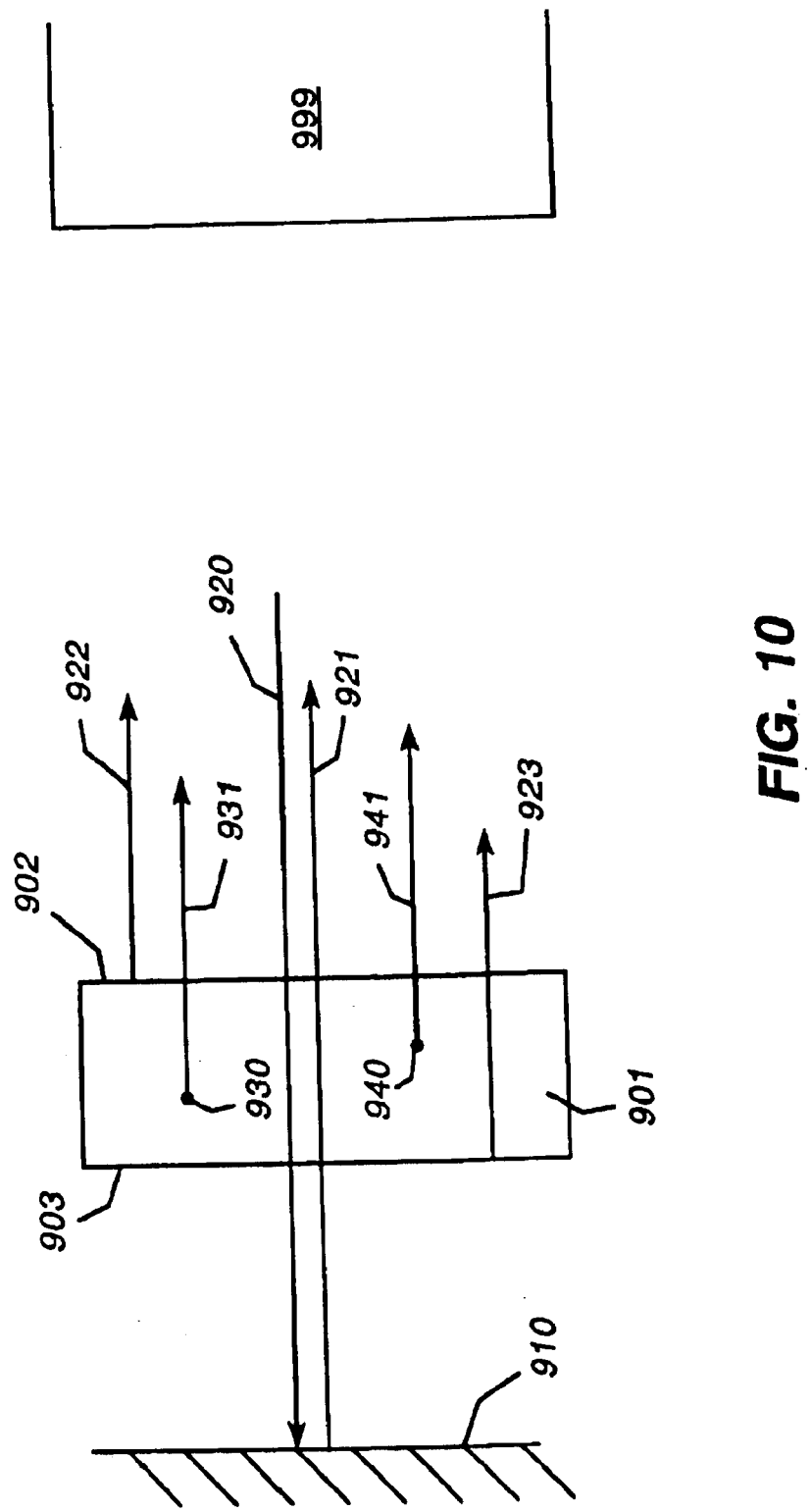
FIG. 10 shows an embodiment of a cavity including an optical component with defects.

In FTPSI, each optical interface within a cavity contributes a telltale peak to the transform spectrum (assuming the tuning increment and range are appropriate). This feature can be used to detect optical defects within optical components. Referring to FIG. 10, a transparent parallel plate 901 is characterized using FTPSI. Plate 901 is appropriately positioned with respect to a reference surface 910. Parallel plate surfaces 902 and 903, together with reference surface 910 define three elemental cavities.

During FTPSI characterization, a light beam 920, is introduced into the system. Surfaces 902 and 903, and reference surface 910 reflect beams 922, 923 and 921, respectively. A CCD camera 999 detects a superposition of these reflected beams, and generates an interference signal proportional to the intensity of the superposition. The intensity signal is analyzed as described in above.

Included in parallel plate 901 are two defects 930 and 940. These defects are regions within parallel plate 901 with a different refractive index to the surrounding material, and scatter incident light back towards the detector. Examples of defects include air bubbles or impurities within the material of parallel plate 901. Defects 930 and 940 scatter some of the incident light of beam 920. Provided the defects are of sufficient size and shape, the back-scattered components, depicted as rays 931 and 941, respectively, form plane waves similar to those scattered by other surfaces in the cavity. At the particular area in the cross-section of the system where they occur, defects 930 and 940 make contributions to the detected superposition at CCD camera 999, and behave like a surface defining additional elemental two surface cavities to the system.

Hence, the pixel co-ordinates at which the anomalous peaks occur indicate the lateral position of the defects in plate 901. The frequencies, being proportional to the OPL of the "elemental cavities" defined by the defects and other surfaces yield information regarding the depth position of the defects in the plate. Thus, not only can defects be identified using FTPSI, but also their exact location in three dimensions can be determined.

Smaller defects can also be detected using FTPSI. Light scattered by small defects form approximately spherical wavefronts, a portion of which will contribute to the interference signal at the detector. Due to the divergent nature of the scattered wavefronts, light scattered from the defects contribute to the interference signal at all detector pixels. As a result, simply identifying the pixels at which a corresponding contribution to the frequency spectrum occurs does not easily allow one identify the lateral location of the defects. However, the defects can be localized through subsequent FTSPI analysis of their contribution to the interferogram, e.g., by identifying the center of the telltale ring pattern.

Figure 11:
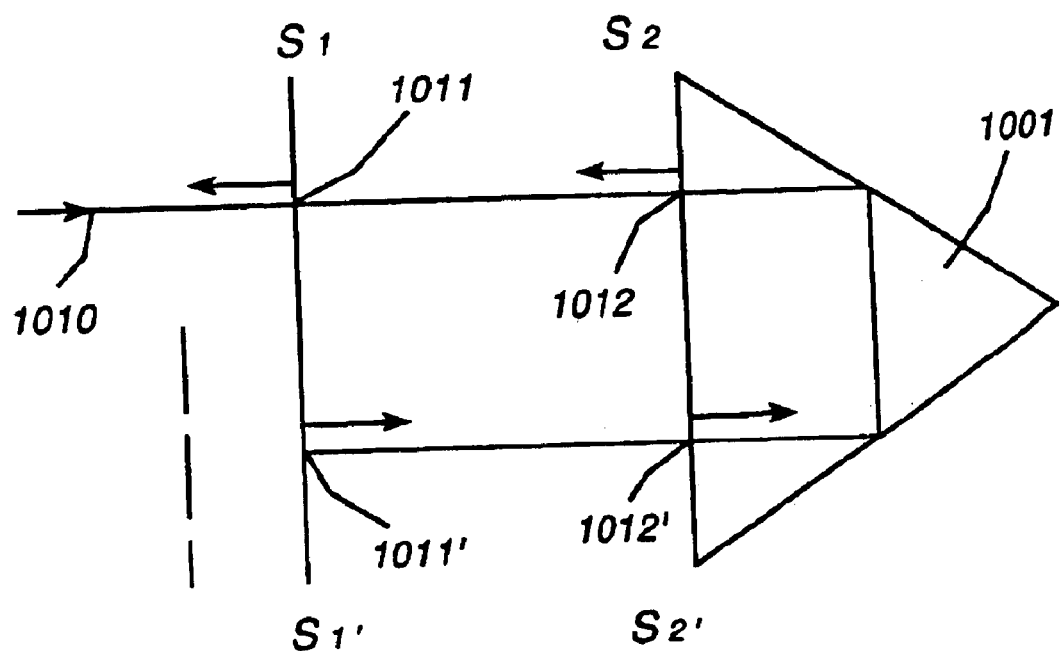
FIG. 11 shows an embodiment of a cavity including a right angle prism.

Referring to FIG. 11, measurements of internal angles of various optical elements (e.g., prisms or cubes) can also be realized using FTPSI. For example, FIG. 11 shows a possible geometry for measuring the 90° angle and the pyramidal error of a right angle prism 1001. To 1st order, a ray 1010 encounters 4 surfaces (actually, 2 surfaces twice) before leaving the cavity. These surfaces are labeled 1011, 1012, 1011' and 1012', the prime indicating the second reflection from that surface. Surface 1011 (and 1011') is a reference surface. The 1011:1012 cavity provides a measure of the 1012 surface profile and orientation. The orientation direction of surface 1012 provides a reference for the non-retro direction (e.g., the tilt of the retro reflector) for the pyramidal error. The tilt of the 1011:1011' cavity in the retro direction determines the deviation of the right angle from 90°. Note that the direct return of the beam back to the camera usually requires the use of a camera with good dynamic range. The dashed line to the left of 1011 indicates where a beam stop can be used to remove the direct return if necessary. A traditional PSI measurement of this angle requires the removal the 1011 surface and measures the 1012:1012' cavity, however the geometry shown here allows us to simultaneously qualify the 1012 surface against a known reference. In general, FTPSI is used to evaluate internal angles of optical components by measuring the deviation of a return wavefront from a reference wavefront. FTPSI determines the deviation of the internal angle from a nominal angle for which the interferometric system is configured. For the case of a retro reflector, the return wavefront is provided naturally by the optic being measured. For a non-retro reflector, an additional surface, e.g. reference surface or mirror, should be included in the cavity (with predetermined geometry) to provide the return wavefront to the detector.

The above-described FTPSI measurements refer to simple optical systems (e.g., evaluating the internal angle in a single prism, or the index homogeneity of a single optical flat). However, as FTPSI can provide information about several elemental cavities in a single measurement, we can use FTPSI to characterize complex optical assemblies with numerous surfaces (e.g. at least fives surfaces, six surfaces, seven surfaces, eight surfaces, nine surfaces, 10 surfaces) as well. For example, FTPSI can be used to evaluate the alignment and coupling of components in a complex optical assembly. During the manufacture of complex assemblies, spatial relationships between components should be maintained. By measuring these relationships at various steps in the assembly process, FTPSI can qualify each component individually, measure partially completed assemblies and to qualify the completed assembly. FTPSI can also be used after deployment and use of the completed assembly to maintain and/or recalibrate the assembly. FTPSI is used to simultaneously measure the relative positions and surface profiles (e.g., flatness) of optical components in these assemblies. Moreover, FTPSI is used to evaluate interfaces between optically coupled components. The following description is an example of how FTPSI can be used to this end.

Figure 12:
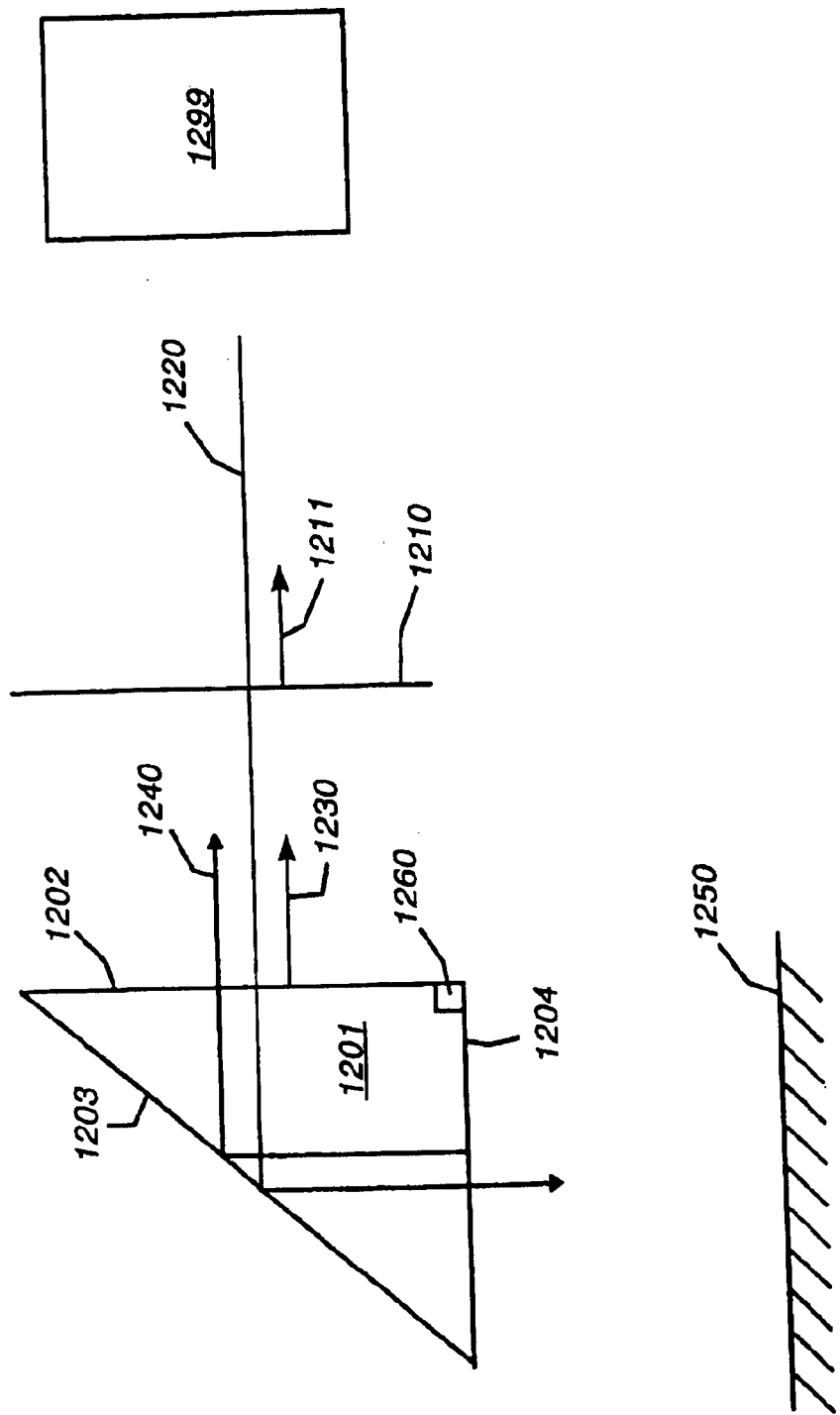
FIG. 12 shows another embodiment of a cavity including a prism.

Referring to FIG. 12, a first component in an optical assembly, a right-angled prism 1201, is positioned relative to a reference surface 1210. A light beam 1220 is directed into prism 1201 through reference surface 1210. Reference surface 1210 reflects beam 1220 back toward detector 1299, providing reference beam 1211. Prism surface 1203 reflects beam 1220 toward prism surface 1204. Note that optical components to collimate the light beam in detector 1299 and to direct it into and through the cavity are omitted from FIG. 12 to avoid making the figure unnecessarily complicated. It is to be understood that in general a system may include numerous other components in addition to those depicted in FIG. 12.

Prism surfaces 1202 and 1204 both reflect a portion of beam 1220 back towards detector 1299. These portions are shown as beams 1230 and 1240, respectively. Detector 1299 detects a superposition of beams 1211, 1230, and 1240, and generates an interference signal proportional to the superposition at each pixel. A computer system, in communication with detector 1299, receives and analyzes the signal.

Prism surfaces 1202 and 1204 and reference surface 1210 define three elemental cavities (the cavity formed by surfaces 1202 and 1204, 1202 and 1210, and 1204 and 1210). The contribution to the interference signal from each cavity is analyzed using FTPSI.

The FTPSI frequency transform generates a spectrum that includes peaks at frequencies $f_1$, $f_2$, and $f_3$. These peaks correspond to the first order interference frequency for the elemental cavities defined by surfaces 1210 and 1202, 1210 and 1204 (via 1203), and 1202 and 1204 (via 1203), respectively. The frequencies are proportional to the total OPL for each elemental cavity and the optical frequency tuning rate. A phase map is determined for each cavity by applying EQ. 4 to each of $f_1$, $f_2$, and $f_3$, from which surface profiles for surfaces 1202 and 1204, and variations in the optical path length of light propagating within different portions of the prism, can be calculated.

A second reference surface 1250, e.g., a reference mirror, is optionally included in the cavity to return an additional measurement beam to the detector via prism 1201. This allows a user to measure any deviation of prism angle 1260 from a nominal value, using, for example, the method described above.

Figure 13:
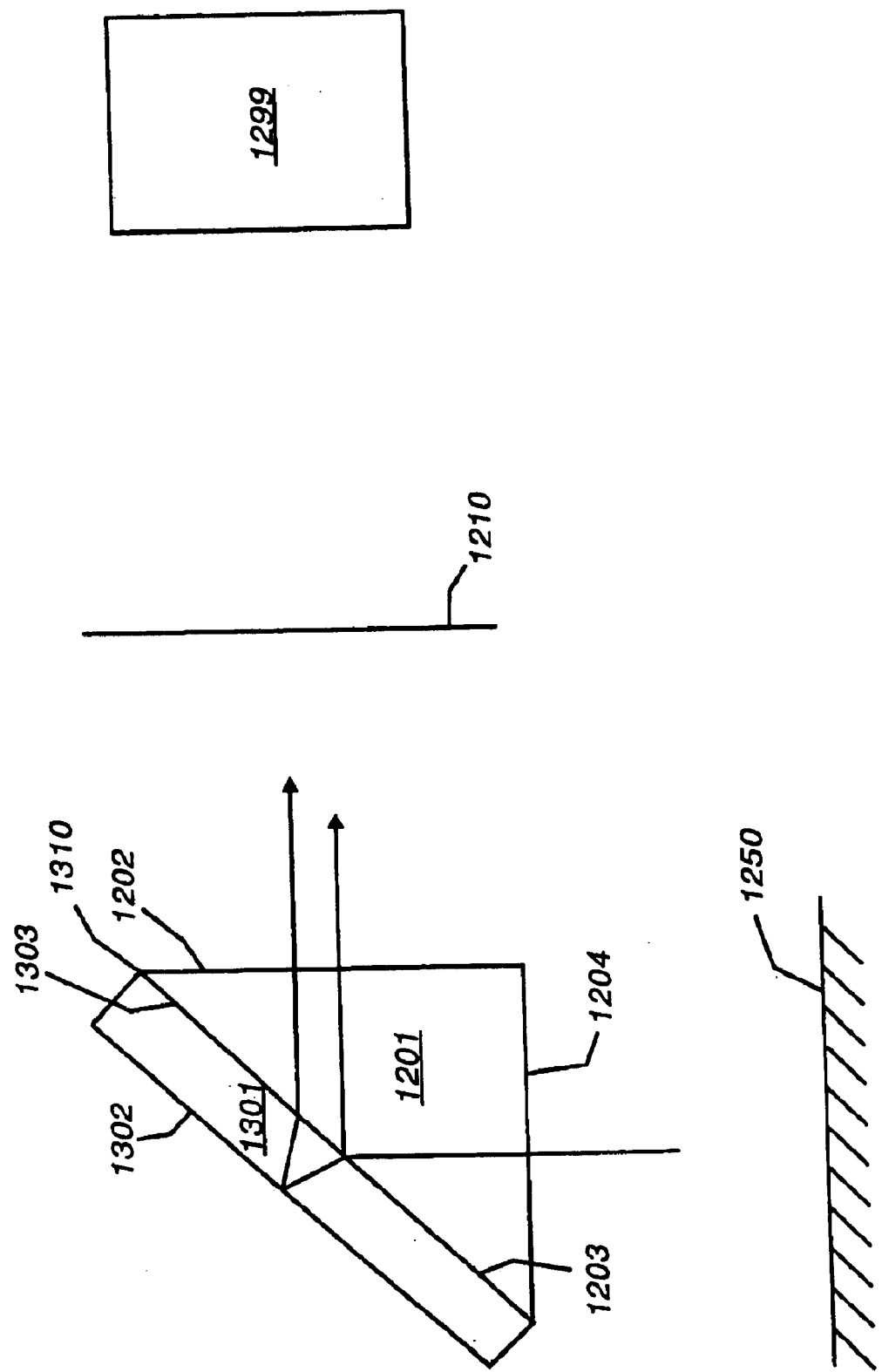
FIG. 13 shows an embodiment of a cavity including two coupled optical components.

Referring now to FIG. 13, a second component e.g., a transparent parallel plate, is added to prism 1201 to create a two-component optical assembly. A first surface 1302 of a transparent parallel plate 1301 is coupled to surface 1203 of prism 1201. Prior to coupling, transparent parallel plate 1301 is characterized in using FTPSI, to obtain surface profiles for plate surfaces 1302 and 1303, the plate wedge (i.e., thickness variation across the parallel plate), and the index homogeneity of the plate.

In the case where an optical interface is intended at interface 1310 (e.g., there is a reflective coating or refractive index mismatch between prism 1201 and parallel plate 1301) an additional surface, parallel plate surface 1303, is added to the system and the number of elemental two-surface cavities increases from 3 to 5.

FTPSI analysis of this system yields first-order transform frequencies at $f_1$, $f_2$, $f_3$, $f_2'$, and $f_3'$. Provided the position of the prism with respect to reference surface 1210 is unchanged from the previous measurement, these frequencies correspond to the original three elemental cavities plus two additional elemental cavities defined by surfaces 1210 and 1204 (via 1302) (to which peak $f_2'$ corresponds), and 1202 and 1204 (via 1302) (to which peak $f_3'$ corresponds). A phase is extracted from each frequency peak using EQ. 4. Note that both $f_2$ and $f_2'$ correspond to cavities defined by surfaces 1210 and 1204, and $f_3'$ and $f_3'$ correspond to cavities defined by surfaces 1202 and 1204. Hence, any difference in the phase map between these two cavities can be attributed to parallel plate 1301 and/or the alignment between the prism and the plate. As plate 1301 was previously characterized in a separate FTPSI measurement, differences in these phase maps due to plate 1301 can be accounted for, and the contribution from any misalignment between the components can be determined.

Alternatively, in the case where prism 1201 and parallel plate 1301 are composed of optically similar materials (e.g., they have the same refractive index) and the components are to be perfectly optical coupled, there should be no reflection from prism surface 1301 and no additional elemental two-surface cavities are added to the system, however their frequencies will change corresponding to the increased OPL due to the presence of the parallel plate.

In this case, when the coupling between prism 1201 and parallel plate 1301 is ideal, the FTPSI analysis yields only frequencies at $f_1$, $f_2'$, and $f_3'$, corresponding to elemental cavities defined by surface pairs 1210 and 1202, 1210 and 1204 (via 1302), and 1202 and 1204 (via 1302), respectively. Using EQ. 4, a phase map for each elemental cavity is determined for $f_1$, $f_2'$, and $f_3'$. As the orientation of surface 1202 and 1204 with respect to each other are known (from the single prism measurement), any shift in this orientation can be attributed to non-parallel alignment of surface 1302 to surface 1203. Any anomalous peaks at $f_2$, and $f_3$ are indicative of non-ideal coupling at interface 1310. By analyzing the strength of the anomalous peaks, and their location, the user can determine whether the parts need resetting. Note that these peaks may be evident only in a small area of the interface, which can be determined from the detector pixel co-ordinates at which the anomalous peaks occur (e.g., similarly to the defect analysis described above). Also, as the peak frequencies are proportional to the OPL of the elemental cavities from which they arise, a depth co-ordinate of the faulty coupling can be ascertained. While this information may be redundant in the current example as there is only one optical interface in the assembly, as the complexity of the optical assembly increases this information can be extremely useful as it directly pinpoints the exact location of any defective interface in three-dimensions.

Figure 14:
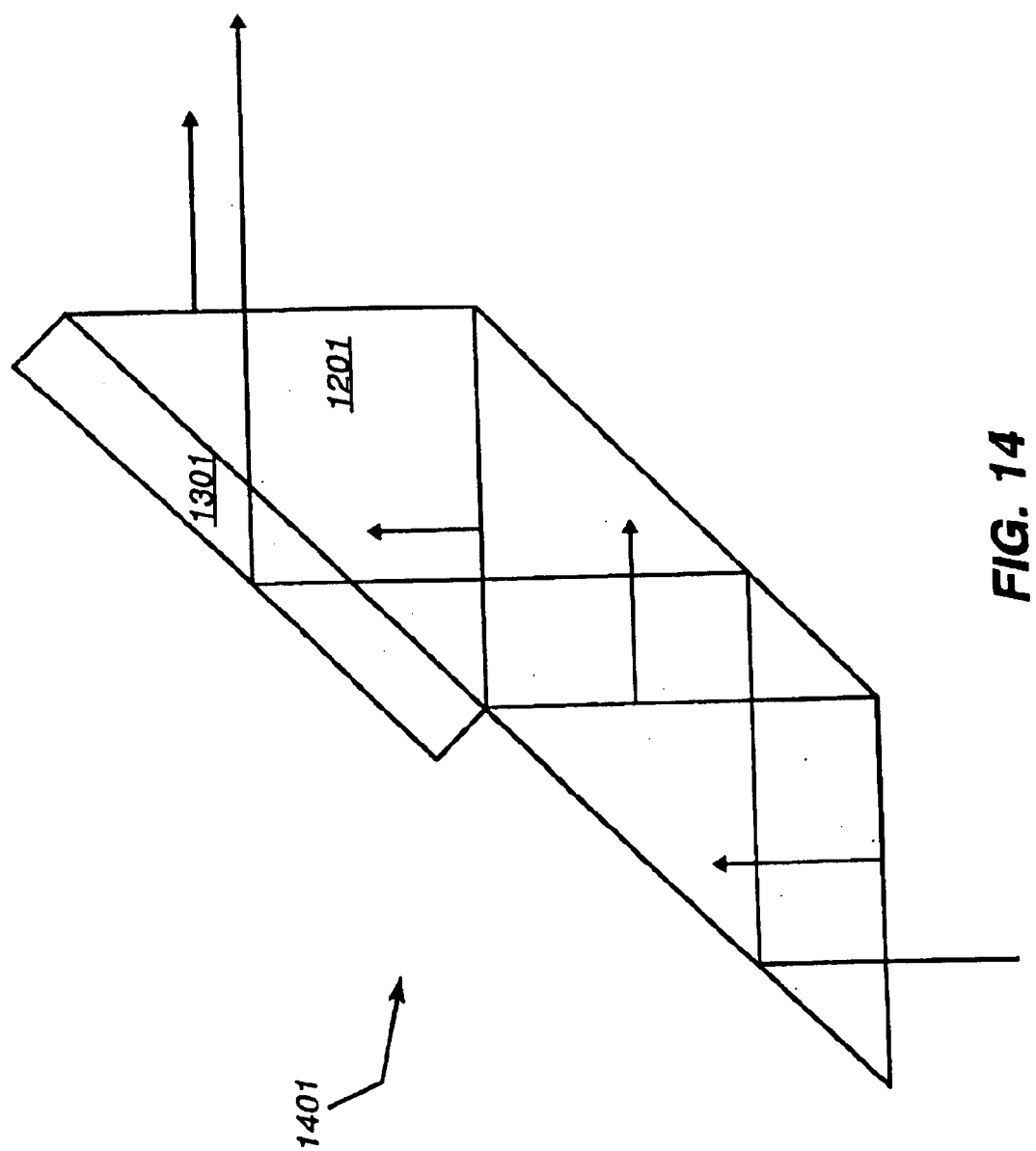
FIG. 14 shows an embodiment of a cavity including a complex optical assembly.

Referring to FIG. 14, this method is applied to expanded complex optical assembly 1401, including prism 1201 and parallel plate 1301. Expanded complex optical assembly 1401 is assembled part-by-part. After each new part is connected, a FTPSI analysis is performed on the assembly. As above, each new optical interface contributes a reflected beam to the superposition, and increases the number of elemental two-surface cavities in the system. The frequency and phase for each cavity yields information about the integrity of each interface in the complex assembly.

In cases where one part is (ideally) optically coupled to a previous component, frequencies from the elemental cavities defined by that surface should vanish from the frequency spectrum. Any frequency peak observed indicates an imperfect coupling, which can be reset before other components are added to the assembly.

In general, this method can be applied to any complex optical assembly. Characterizing an optical component using FTPSI both before and after it is included in an optical assembly allows comparisons to be made between the optical surface integrity (e.g., position, flatness, reflectivity) of component surfaces as the assembly is being manufactured. For all cavities to register a peak in the frequency spectrum, the optical frequency tuning range should be large enough to resolve the shortest elemental cavity in the assembly, and the optical frequency increment in the tune should be small enough to accommodate the largest cavity without exceeding a $2\pi$ phase shift. Ideally, each elemental cavity should have a different OPL in order for the phases from the first order frequency peaks for each elemental cavity be obtained with high accuracy. Additionally, all previously mentioned measurements (e.g., surface reflectivity, high-finesses cavities, refractive index homogeneity, defect analysis) may be applied to complex optical assemblies.

In any of the embodiments described above, the computer can include hardware, software, or a combination of both to control the other components of the system and to analyze the phase-shifted images to extract the desired information about the measurement object. The analysis described above can be implemented in computer programs using standard programming techniques. Such programs are designed to execute on programmable computers each comprising a processor, a data storage system (including memory and/or storage elements), at least one input device, at least one output device, such as a display or printer. The program code is applied to input data (e.g., phase-shifted images from a CCD camera) to perform the functions described herein and generate information (e.g., the topography of a selected surface), which is applied to one or more output devices. Each computer program can be implemented in a high-level procedural or object-oriented programming language, or an assembly or machine language. Each such computer program can be stored on a computer readable storage medium (e.g., CD ROM or magnetic diskette) that when read by a computer can cause the processor in the computer to perform the analysis described herein.

A number of embodiments of the invention have been described. Nevertheless, it will be understood that various modifications may be made without departing from the spirit and scope of the invention.

What is claimed is:

1. An interferometry method comprising:
    forming an optical interference image by combining different portions of an optical wave front reflected from multiple surfaces;
    recording an interference signal at different locations of the optical interference image in response to varying a property of the optical wave front that causes pairs of the multiple surfaces that have different optical path separations to contribute differently to the interference signal;
    transforming the interference signal for at least one of the locations to produce a spectrum having a peak at a spectral coordinate corresponding to each pair of the multiple surfaces; and
    identifying the spectral coordinate of the peak corresponding to a selected pair of the multiple surfaces.

2. The method of claim 1, further comprising, for each location, extracting the spectral phase of the interference signal at the spectral coordinate of the peak corresponding to the selected pair of surfaces.

3. The method of claim 2, wherein extracting the spectral phase of the interference signal for each location comprises transforming the interference signal for each of the remaining locations to produce a corresponding spectrum having the peak corresponding to the selected pair of surfaces.

4. The method of claim 2, wherein extracting the spectral phase of the interference signal for each location comprises transforming the interference signal for each of the remaining locations with respect to the spectral coordinate of the peak corresponding to the selected pair of surfaces.

5. The method of claim 4, further comprising determining whether or not a defect is present between the selected pair of surfaces based on the spectrum at each of the multiple locations.

6. The method of claim 5, wherein the presence of the defect corresponds to an additional peak in the spectrum of at least one of the multiple locations.

7. The method of claim 5, wherein the selected pair of surfaces is the front and back surfaces of an optical component, and wherein the defect comprises an air bubble in the optical component.

8. The method of claim 5, wherein the selected pair of surfaces is the front and back surfaces of an optical component, and wherein the defect comprises an impurity in the optical component.

9. The method of claim 2, further comprising determining variations in an optical path distance between the selected pair of surfaces based on variations in the extracted phase for the multiple locations of the optical interference image.

10. The method of claim 9, further comprising calculating a surface profile of one of the selected pair of surfaces based on the determined variations.

11. The method of claim 9, further comprising calculating an optical thickness profile between the selected pair of surfaces based on the determined variations.

12. The method of claim 9, further comprising calculating a physical thickness profile between the selected pair of surfaces based on the determined variations.

13. The method of claim 9, further comprising calculating a homogeneity profile between the selected pair of surfaces based on the determined variations.

14. The method of claim 1, wherein the interference signal is recorded at different locations of the optical interference image in response to varying the optical frequency of the optical wave front.

15. The method of claim 1, wherein the interference signal is recorded at different locations of the optical interference image in response to varying the propagation direction of the optical wave front.

16. The method of claim 15, wherein varying the propagation direction of the optical wave front comprises changing the position of an illumination source point used to produce the optical wave front.

17. The method of claim 15, wherein varying the propagation of the optical wave front comprises varying a diameter of a ring-shaped light source used to produce the optical wave front.

18. The method of claim 1, wherein the spectrum is produced by transforming the interference signal from a time domain to a frequency domain.

19. The method of claim 1, wherein the spectrum is produced by transforming the interference signal into an optical path difference (OPD) domain.

20. The method of claim 1, further comprising monitoring a reference phase from a reference cavity produced in response to an additional portion of the optical wave front.

21. The method of claim 20, wherein the spectrum is produced by transforming the interference signal into an optical path difference domain (OPD) based on the monitored reference phase.

22. The method of claim 21, wherein the spectrum S corresponds to $S(D)=|OPLT(D)|^2$, where D is a variable for optical path difference and $OPLT(D)$ is an OPD transform, which can be expressed as:

$$OPLT(D) = \sum_{j=0}^{N-1} I_j W_j \exp\left(-i\varphi_{Mj} \frac{D}{D_M}\right) \Delta \varphi_{Mj},$$

where there are N increments to the varying of the optical wave front property, j is an index for the N increments, $I_j$ is the interference signal at increment j, $W_j$ is a value for a weighting function at increment j, $D_M$ corresponds to an optical path length of the reference cavity, $\varphi_{Mj}$ is the monitored reference phase at increment j, and $\Delta \varphi_{Mj}$ is an increment in the monitored reference phase corresponding to increment j.

23. The method of claim 22, further comprising, for each location, extracting the spectral phase of the interference signal at the spectral coordinate of the peak corresponding to the selected pair of surfaces, wherein the extracted phase $\varphi_T$ can be calculated from $\varphi_T(D_T)=\arg[OPLT(D_T)]$, where $D_T$ is the spectral coordinate of the peak.

24. The method of claim 21, further comprising determining an optical path difference between the selected pair of surfaces from the OPD coordinate of the corresponding peak.

25. The method of claim 1, wherein the multiple surfaces include at least one reference surface and at least one surface of a test object.

26. The method of claim 1, wherein recording the interference signal comprises monitoring intensity variations in the optical wave front during the varying of the property of the wave front and compensating the interference signal for the intensity variations.

27. The method of claim 1, further comprising calculating information about surface reflectivity for at least one of the selected pair of surfaces based on amplitudes of at least some of the peaks in the spectrum.

28. The method of claim 1, wherein the selected pair of surfaces are surfaces of a high-finesse cavity, having a reflectivity greater than about 70%.

29. The method of claim 1, further comprising:
identifying the spectral coordinate of the peak corresponding to a second selected pair of the multiple surfaces.

30. The method of claim 29, further comprising:
for each location, extracting the spectral phase of the interference signal at the coordinate of the peak corresponding to the first selected pair of surfaces and the coordinate of peak corresponding to the second selected pair of surfaces.

31. The method of claim 30, wherein the selected surfaces comprise a first reference surface, a first surface of an optical component, and a second reference surface, wherein one of the wave front portions is directed to the second reference surface via a reflection from at least one internal surface of the optical component.

32. The method of claim 31, further comprising determining an angular orientation of the internal surface of the optical component relative to the first surface of the optical component based on the extracted phases.

33. The method of claim 31, wherein the at least one internal surface comprises two internal surfaces defining an internal angle, and wherein the method further comprises determining the internal angle based on the extracted phases.

34. The method of claim 31, wherein the optical component is a prism.

35. The method of claim 34, wherein the optical component is a right-angle prism having two internal surfaces defining a nominal right angle, and wherein the at least one internal surface comprises the two internal surfaces defining the nominal right angle and the first surface of the optical component is a front face of the right-angle prism.

36. The method of claim 34, wherein the optical component is a right-angle prism having two surfaces defining a nominal right angle, wherein the at least one internal surface is a hypotenuse surface connecting the two surfaces defining the nominal right angle and the first surface of the optical component is one of the two surfaces defining the nominal right angle.

37. The method of claim 30, wherein the selected surfaces comprise multiple surfaces of an optical component.

38. The method of claim 37, wherein the optical component is a prism.

39. The method of claim 29, wherein the selected surfaces comprise multiple surfaces of an optical assembly, and wherein one of the multiple surfaces is an interface between two components of the optical assembly.

40. The method of claim 1, wherein the selected surfaces comprise surfaces of an optical component, and wherein the portion of the wavefront reflected from one of the selected surfaces is directed to that surface via a reflection from an internal surface of the optical component.

41. The method of claim 1, wherein the selected surfaces comprise surfaces of an optical assembly, and wherein the portion of the wavefront reflected from one of the selected surfaces is directed to that surface via a reflection from an interface between two components of the optical assembly.

42. An optical assembly method comprising:
attaching a first optical component to a second optical component to produce an optical assembly;
interferometrically characterizing the optical assembly using the method of claim 1; and
reseting the first optical component relative to the second optical component based on the interferometric characterization.

43. A method for determining a presence of a defect in an optical component, the method comprising:
forming an optical interference image by combining different portions of an optical wave front reflected from multiple surfaces, wherein the multiple surfaces comprise at least one surface of the optical component;
recording an interference signal at different locations of the optical interference image in response to varying a property of the optical wave front that causes pairs of the multiple surfaces that have different optical path separations to contribute differently to the interference signal;
transforming the interference signal for at least one of the locations to produce a spectrum having a peak at a spectral coordinate corresponding to each pair of the multiple surfaces; and
determining whether the defect is present in the optical component based on the spectrum, wherein the defect corresponds to an anomalous peak in the spectrum for at least one of the locations.

44. The method of claim 43, wherein the defect comprises an air bubble in the optical component.

45. The method of claim 43, wherein the defect comprises an impurity in the optical component.

46. The method of claim 43, wherein the defect comprises a region of imperfect coupling between two sub-components of the optical component.

47. A system comprising:
a light source including a modulation component configured to vary a property of an optical wave front derived from the light source;
an interferometer which during operation directs different portions of the optical wave front to multiple surfaces and recombines the different portions to form an optical interference image;
a multi-element photo-detector positioned to record an interference signal at different locations of the optical interference image in response to the variation of the optical wave front property by the modulation component, wherein the variation of the wave front property causes pairs of the multiple surfaces that have different optical path separations to contribute differently to the interference signal; and
an electronic controller coupled to the light source and the photo-detector, wherein during operation the electronic controller: transforms the interference signal for at least one of the locations to produce a spectrum having a peak at a spectral coordinate corresponding to each pair of the multiple surfaces; and identifies the spectral coordinate of the peak corresponding to a selected pair of the multiple surfaces.

48. The system of claim 47, wherein the electronic controller is further configured to extract the spectral phase of the interference signal at the spectral coordinate of the peak corresponding to the selected pair of surfaces for each of the location.

49. The system of claim 47, wherein the modulation component is configured to vary the optical frequency of the optical wave front and the detector is configured to record the interference signal at different locations of the optical interference image in response to the variation of the optical frequency of the optical wave front by the modulation component.

50. The system of claim 47, wherein modulation component is configured to vary the propagation direction of the optical wave front and the detector is configured to record the interference signal at different locations of the optical interference image in response to the variation of the propagation direction of the optical wave front by the modulation component.

51. The system of claim 47, wherein the electronic controller produces the spectrum by transforming the interference signal from a time domain to a frequency domain.

52. The system of claim 47, wherein the electronic controller produces the spectrum by transforming the interference signal into an optical path difference (OPD) domain.

53. The system of claim 47, further comprising an optical frequency monitor comprising reference cavity, and wherein the optical frequency monitor is configured to monitor a reference phase from the reference cavity produced in response to an additional portion of the optical wave front.

54. The system of claim 53, wherein the electronic controller produces the spectrum by transforming the interference signal into an optical path difference domain (OPD) based on the monitored reference phase.

55. The system of claim 54, wherein the spectrum S corresponds to $S(D)=|OPLT(D)|^2$, where D is a variable for optical path difference and OPLT(D) is an OPD transform, which can be expressed as:

$$OPLT(D) = \sum_{j=0}^{N-1} I_j W_j \exp\left(-i\varphi_{Mj}\frac{D}{D_M}\right)\Delta\varphi_{Mj},$$

where there are N increments to the varying of the optical wave front property, j is an index for the N increments, $I_j$ is the interference signal at increment j, $W_j$ is a value for a weighting function at increment j, $D_M$ corresponds to an optical path length of the reference cavity, $\phi_{Mj}$ is the monitored reference phase at increment j, and $\Delta\phi_{Mj}$ is an increment in the monitored reference phase corresponding to increment j.

56. The system of claim 54, wherein the electronic controller is further configured to determine an optical path difference between the selected pair of surfaces from the OPD coordinate of the corresponding peak.

57. The system of claim 55, wherein the electronic controller is further configured to, for each location, extract the spectral phase of the interference signal at the spectral coordinate of the peak corresponding to the selected pair of surfaces, wherein the extracted phase $\phi_T$ can be calculated from $\phi_T(D_T)=\arg[OPLT(D_T)]$, where $D_T$ is the spectral coordinate of the peak.

58. The system of claim 48, wherein the electronic controller is further configured to determine variations in an optical path distance between the selected pair of surfaces based on variations in the extracted phase for the multiple locations of the optical interference image.

59. The system of claim 58, wherein the electronic controller is further configured to calculate a surface profile of one of the selected pair of surfaces based on the determined variations.

60. The system of claim 58, wherein the electronic controller is further configured to calculate an optical thickness profile between the selected pair of surfaces based on the determined variations.

61. The system of claim 58, wherein the electronic controller is further configured to calculate a physical thickness profile between the selected pair of surfaces based on the determined variation.

62. The system of claim 58, wherein the electronic controller is further configured to calculate a homogeneity profile between the selected pair of surfaces based on the determined variations.

63. The system of claim 57, wherein the electronic controller is further configured to calculate information about the surface reflectivity for at least one of the selected pair of surfaces based on amplitudes of at least some of the peaks in the spectrum.

64. The system of claim 57, wherein the electronic controller is further configured to identify the spectral coordinate of the peak corresponding to a second selected pair of the multiple surfaces.

65. The system of claim 64, wherein the electronic controller is further configured to, for each location, extract the spectral phase of the interference signal at the coordinate of the peak corresponding to the first selected pair of surfaces and the coordinate of peak corresponding to the second selected pair of surfaces.

* * * * *

UNITED STATES PATENT AND TRADEMARK OFFICE
CERTIFICATE OF CORRECTION

PATENT NO. : 6,924,898 B2
APPLICATION NO. : 10/304209
DATED : August 2, 2005
INVENTOR(S) : Leslie L. Deck It is certified that error appears in the above-identified patent and that said Letters Patent is hereby corrected as shown below:

<u>Column 4</u>
Line 11, replace "$\phi_{Mj}$" with -- $\varphi_{Mj}$ --
Line 12, replace "$\Delta\phi_{Mj}$" with -- $\Delta\varphi_{Mj}$ --
Line 23, replace "$\phi_T$" with -- $\varphi_T$ -- (two occurrences)

<u>Column 6</u>
Line 64, replace "$\phi_{Mj}$" with -- $\varphi_{Mj}$ --
Line 65, replace "$\Delta\phi_{Mj}$" with -- $\Delta\varphi_{Mj}$ --

<u>Column 7</u>
Line 8, replace "$\phi_T$" with -- $\varphi_T$ --
Line 9, replace "$\phi_T$" with -- $\varphi_T$ --

<u>Column 10</u>
Line 67, replace "$\phi$" with -- $\varphi$ --

<u>Column 11</u>
Line 11, replace "$\phi$" with -- $\varphi$ --
Line 19, replace "$\dot{\phi}$" with -- $\dot{\varphi}$ --

<u>Column 12</u>
Line 19, replace "$\phi$" with -- $\varphi$ --
Line 20, replace "$\phi$" with -- $\varphi$ --

<u>Column 14</u>
Line 9, replace "$\phi$" with -- $\varphi$ --
Line 16, replace "$\phi$" with -- $\varphi$ --
Line 17, replace "$\dot{\phi}$" with -- $\dot{\varphi}$ --

<u>Column 15</u>
Lines 1 through 5, replace "
$\phi_{121:102} = 2kL_1$
$\phi_{102:103} = 2knT$
$\phi_{103:111} = 2kL_2$
" with --
$\varphi_{121:102} = 2kL_1$
$\varphi_{102:103} = 2knT$
$\varphi_{103:111} = 2kL_2$
--

Line 14, replace "$\phi_{121:111} = 2k(L_1 + T + L_2)$" with -- $\varphi_{121:111} = 2k(L_1 + T + L_2)$ --
Line 25, replace "$\phi = 2k\bar{n}L + \phi$" with -- $\varphi = 2k\bar{n}L + \phi$ --

<u>Column 16</u>
Line 36, replace "$\dot{\phi}$" with -- $\dot{\varphi}$ --
Line 45, replace "$\dot{\phi} = \Delta\phi/\Delta t$" with -- $\dot{\varphi} = \Delta\varphi/\Delta t$ --

UNITED STATES PATENT AND TRADEMARK OFFICE
CERTIFICATE OF CORRECTION

PATENT NO. : 6,924,898 B2
APPLICATION NO. : 10/304209
DATED : August 2, 2005
INVENTOR(S) : Leslie L. Deck It is certified that error appears in the above-identified patent and that said Letters Patent is hereby corrected as shown below:

Column 17
Line 22, replace "$\dot{\phi}_M$" with --$\dot{\varphi}_M$--
Line 42, replace "$\Delta\dot{\phi}_{Tj}$" with --$\Delta\dot{\varphi}_{Tj}$--

Column 18
Line 28, replace "$\phi_M$" with --$\varphi_M$--
Line 31, replace "$\phi_M$" with --$\varphi_M$--
Line 33, replace "$\phi_M$" with --$\varphi_M$--
Line 59, replace "$\phi_T(D_T) = \arg[OPLT(D_T)]$" with --$\varphi_T(D_T) = \arg[OPLT(D_T)]$--

Column 24
Line 22, replace "$\Delta\phi$" with --$\Delta\varphi$--
Line 33, replace "$\Delta\phi$" with --$\Delta\varphi$--

Column 31
Line 61, replace "$\phi$" with --$\varphi$--
Line 62, replace "$\phi$" with --$\varphi$--

Column 32
Line 1, replace replace "$\phi$" with --$\varphi$--
Line 2, replace "$\phi$" with --$\varphi$--

Column 34
Line 1, delete ":" after "controller"
Line 11, replace "location" with --locations--
Line 53, replace "$\phi$" with --$\varphi$--
Line 54, replace "$\phi$" with --$\varphi$--
Line 65, replace "$\phi$" with --$\varphi$--
Line 66, replace "$\phi$" with --$\varphi$--

UNITED STATES PATENT AND TRADEMARK OFFICE
CERTIFICATE OF CORRECTION

PATENT NO. : 6,924,898 B2
APPLICATION NO. : 10/304209
DATED : August 2, 2005
INVENTOR(S) : Leslie L. Deck It is certified that error appears in the above-identified patent and that said Letters Patent is hereby corrected as shown below:

<u>Column 35</u>
Line 17, replace "variation" with --variations--

Signed and Sealed this

Fifteenth Day of August, 2006

JON W. DUDAS
*Director of the United States Patent and Trademark Office*